United States Patent
Mendonsa et al.

(10) Patent No.: US 11,423,927 B2
(45) Date of Patent: Aug. 23, 2022

(54) ASSEMBLY THAT ENABLES REDUCTION IN DISK TO DISK SPACING

(71) Applicant: Seagate Technology LLC, Fremont, CA (US)

(72) Inventors: Riyan Alex Mendonsa, Edina, MN (US); Edward Charles Gage, Lakeville, MN (US); Kevin Gomez, Eden Prairie, MN (US); Brett R. Herdendorf, Mound, MN (US); Dan Mohr, Saint Paul, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/352,703

(22) Filed: Jun. 21, 2021

(65) Prior Publication Data

US 2021/0312945 A1   Oct. 7, 2021

Related U.S. Application Data

(63) Continuation-in-part of application No. 16/805,174, filed on Feb. 28, 2020, now Pat. No. 11,043,235, which is a continuation-in-part of application No. 15/965,097, filed on Apr. 27, 2018, now Pat. No. 10,811,045.

(51) Int. Cl.
| | |
|---|---|
| *G11B 5/68* | (2006.01) |
| *G11B 5/54* | (2006.01) |
| *G11B 5/012* | (2006.01) |
| *G11B 21/00* | (2006.01) |

(52) U.S. Cl.
CPC ............ *G11B 5/012* (2013.01); *G11B 21/003* (2013.01)

(58) Field of Classification Search
CPC .. G11B 5/68; G11B 5/82; G11B 27/36; G11B 5/54
USPC ......................................................... 360/135
See application file for complete search history.

(56) References Cited

U.S. PATENT DOCUMENTS

| | | |
|---|---|---|
| 3,311,902 A | 3/1967 | Appleton |
| 3,940,794 A | 2/1976 | Griffiths et al. |
| 4,164,767 A | 8/1979 | Gyi et al. |
| 4,208,685 A | 6/1980 | Matla et al. |
| 4,566,087 A | 1/1986 | Kraft |

(Continued)

FOREIGN PATENT DOCUMENTS

WO   2020018854 A1   1/2020

OTHER PUBLICATIONS

USPTO-issued prosecution for U.S. Appl. No. 15/946,859, filed Feb. 28, 2020, including: Applicant Initiated Interview Summary dated Oct. 19, 2020, 3 pages; Non-Final Rejection dated Aug. 5, 2020, 9 pages; Applicant Initiated Interview Summary dated Jul. 13, 2020, 3 pages; Restriction Requirement dated May 19, 2020, 8 pages; 23 pages total.

(Continued)

*Primary Examiner* — Nabil Z Hindi

(74) *Attorney, Agent, or Firm* — Westman, Champlin & Koehler, P.A.

(57) ABSTRACT

A data storage system includes a data storage foil mounted within the data storage system, the data storage foil has at least one data storage surface. The data storage system also includes a head configured to interact with the at least one data storage surface to carry out at least one of data read or data write operations.

16 Claims, 25 Drawing Sheets

(56) References Cited

U.S. PATENT DOCUMENTS

| | | |
|---|---|---|
| 4,742,410 A | 5/1988 | Smith |
| 4,839,756 A | 6/1989 | Chew et al. |
| 4,884,261 A | 11/1989 | Dalziel |
| 4,888,751 A | 12/1989 | Yoshimaru et al. |
| 5,023,737 A | 6/1991 | Yaeger |
| 5,283,705 A | 2/1994 | Iwabuchi |
| 5,293,282 A | 3/1994 | Squires et al. |
| 5,307,224 A | 4/1994 | Minase |
| 5,341,260 A | 8/1994 | Jabbar |
| 5,343,347 A | 8/1994 | Gilovich |
| 5,347,414 A | 9/1994 | Kano |
| 5,459,921 A | 10/1995 | Hudson et al. |
| 5,467,238 A | 11/1995 | Lee et al. |
| 5,550,695 A | 8/1996 | Matsumoto |
| 5,764,437 A | 6/1998 | Meyer et al. |
| 5,831,795 A | 11/1998 | Ma et al. |
| 5,968,627 A * | 10/1999 | Nigam ............... G11B 5/4886 |
| 5,973,886 A | 10/1999 | Khuu |
| 5,973,887 A | 10/1999 | Cameron |
| 5,995,332 A | 11/1999 | Patterson |
| 5,999,351 A | 12/1999 | Albrecht et al. |
| 6,005,747 A | 12/1999 | Gilovich |
| 6,055,134 A | 4/2000 | Boutaghou |
| 6,067,208 A | 5/2000 | Segar |
| 6,081,399 A | 6/2000 | Lee et al. |
| 6,091,576 A | 7/2000 | Eckerd et al. |
| 6,115,214 A | 9/2000 | Allsup et al. |
| 6,122,130 A | 9/2000 | Boutaghou et al. |
| 6,134,076 A | 10/2000 | Boutaghou et al. |
| 6,157,520 A | 12/2000 | Mangold et al. |
| 6,160,686 A | 12/2000 | Albrecht et al. |
| 6,201,666 B1 | 3/2001 | Resh |
| 6,275,356 B1 | 8/2001 | Boutaghou et al. |
| 6,278,584 B1 | 8/2001 | Zhang et al. |
| 6,344,950 B1 | 2/2002 | Watson et al. |
| 6,404,580 B1 | 6/2002 | Fioravanti |
| 6,449,129 B1 | 9/2002 | MacPherson et al. |
| 6,452,753 B1 | 9/2002 | Hiller et al. |
| 6,473,268 B2 | 10/2002 | Simozato |
| 6,473,270 B1 | 10/2002 | McDonald et al. |
| 6,480,361 B1 | 11/2002 | Patterson |
| 6,487,050 B1 | 11/2002 | Liu |
| 6,490,135 B1 | 12/2002 | Sannino et al. |
| 6,507,460 B2 | 1/2003 | Fayeulle et al. |
| 6,519,115 B1 | 2/2003 | Yaeger |
| 6,577,473 B1 | 6/2003 | MacPherson et al. |
| 6,597,540 B2 | 7/2003 | Tsuda et al. |
| 6,621,651 B1 | 9/2003 | Ratliff et al. |
| 6,650,506 B1 | 11/2003 | Risse |
| 6,693,773 B1 | 2/2004 | Sassine |
| 6,710,964 B1 | 3/2004 | Rao et al. |
| 6,775,107 B2 | 8/2004 | Kasajima et al. |
| 6,847,504 B1 | 1/2005 | Bennett et al. |
| 6,855,282 B2 | 2/2005 | Fayeulle et al. |
| 6,952,319 B2 | 10/2005 | Weiehelt et al. |
| 6,989,965 B2 | 1/2006 | Mundt et al. |
| 7,102,842 B1 | 9/2006 | Howard |
| 7,385,781 B1 | 6/2008 | Craig et al. |
| 7,548,399 B2 | 6/2009 | Shin |
| 7,672,083 B1 | 3/2010 | Yu et al. |
| 7,675,712 B2 | 3/2010 | Liu et al. |
| 7,733,610 B2 | 6/2010 | Scura et al. |
| 7,813,078 B1 | 10/2010 | Gleason et al. |
| 7,848,057 B1 | 12/2010 | Shukla |
| 7,986,491 B2 | 7/2011 | Albrecht et al. |
| 8,024,853 B2 | 9/2011 | Rivera |
| 8,035,913 B2 | 10/2011 | Kim et al. |
| 8,112,580 B2 | 2/2012 | Bandic et al. |
| 8,194,345 B2 | 6/2012 | Kwon et al. |
| 8,208,215 B2 | 6/2012 | Molaro et al. |
| 8,493,690 B1 | 7/2013 | Ono et al. |
| 8,824,094 B1 | 9/2014 | Furlong et al. |
| 8,873,200 B2 | 10/2014 | Warn et al. |
| 8,958,172 B1 | 2/2015 | Hansen |
| 8,958,173 B1 | 2/2015 | Hirano et al. |
| 9,025,277 B1 | 5/2015 | Hirano |
| 9,171,560 B1 | 10/2015 | Davidson et al. |
| 9,183,862 B1 | 11/2015 | Shah et al. |
| 9,218,833 B1 | 12/2015 | Shah et al. |
| 9,449,649 B1 | 9/2016 | Rejae et al. |
| 9,536,552 B1 | 1/2017 | Chen et al. |
| 9,552,835 B1 | 1/2017 | Tamayo et al. |
| 9,704,521 B1 | 7/2017 | Shah et al. |
| 10,269,380 B1 | 4/2019 | Sun et al. |
| 10,622,012 B1 | 4/2020 | Tu et al. |
| 10,803,891 B1 | 10/2020 | Jacoby et al. |
| 2001/0033459 A1 | 10/2001 | Boutaghou |
| 2005/0280945 A1 | 12/2005 | Duvall et al. |
| 2005/0286171 A1 | 12/2005 | Kim et al. |
| 2006/0002028 A1 | 1/2006 | Nayar et al. |
| 2006/0117558 A1 | 6/2006 | Koh et al. |
| 2006/0171078 A1 | 8/2006 | Kajitani |
| 2006/0256478 A1 | 11/2006 | Hayakawa |
| 2009/0279199 A1 | 11/2009 | Zhang |
| 2010/0091408 A1 | 4/2010 | Albrecht et al. |
| 2010/0110589 A1* | 5/2010 | Nigam ............... G11B 5/73919 |
| 2010/0246053 A1 | 9/2010 | Satou |
| 2011/0038074 A1 | 2/2011 | Viskochil et al. |
| 2012/0002328 A1 | 1/2012 | Aoki et al. |
| 2012/0075750 A1 | 3/2012 | Chan et al. |
| 2014/0126084 A1 | 5/2014 | Nakamiya et al. |
| 2019/0333533 A1 | 10/2019 | Mendonsa |
| 2020/0027477 A1 | 1/2020 | Garbarino |
| 2020/0027480 A1 | 1/2020 | Myers et al. |

OTHER PUBLICATIONS

USPTO-issued prosecution for U.S. Appl. No. 16/805,174, filed Feb. 28, 2020, including: Notice of Allowance and Fees Due dated Feb. 3, 2021, 6 pages; Notice of Allowance and Fees Due dated Jan. 11, 2021, 6 pages; Non-Final Rejection dated Sep. 25, 2020, 7 pages; 19 pages total.

USPTO-issued prosecution for U.S. Appl. No. 16/863,287, filed Apr. 30, 2020, including: Final Office Action dated Mar. 23, 2021, 8 pages; Applicant Initiated Interview Summary dated Feb. 26, 2021, 3 pages; Notice of Allowance and Fees Due dated Apr. 22, 2021, 6 pages; Non-Final Rejection dated Dec. 23, 2020, 8 pages; 27 pages total.

Application and Drawings for U.S. Appl. No. 16/863,287, filed Apr. 30, 2020, 22 pages.

Prior Art Database Technical Disclosure, IP.com No. IPCOM000228512D, "Retracting Load/Unload Ramp", https://ip.com/IPCOM/000228512, dated Jun. 14, 2013, 6 pages.

Maplesoft Application Brief, "Optimal Control Design of a Voice Coil Head Actuator in a Hard Drive", www.maplesoft.com/appsbriefs, dated 2008, 30 pages.

World's first commercial Hard Drive—IBM 350 (RAMAC); https://www.youtube.com/watch?v=aTkL4FQL2FI; Nov. 27, 2016; 5 pages.

USPTO-issued prosecution for U.S. Appl. No. 15/965,097, filed Apr. 27, 2018, including: Applicant Initiated Interview Summary (PTOL-413) dated Feb. 4, 2020, 3 pages; Non-Final Rejection dated Nov. 21, 2019, 7 pages; Notice of Allowance and Fees Due (PTOL-85) dated Aug. 6, 2019, 7 pages; Non-Final Rejection dated Apr. 12, 2019, 7 pages; Final Office Action dated Mar. 11, 2020, 8 pages; Notice of Allowance and Fees Due (PTOL-85) dated May 20, 2020, 6 pages; Non-Final Office Action dated Jul. 13, 2020, 6 pages; Notice of Allowances and Fees Due (PTO-85) dated Sep. 22, 2020, 6 pages total.

* cited by examiner

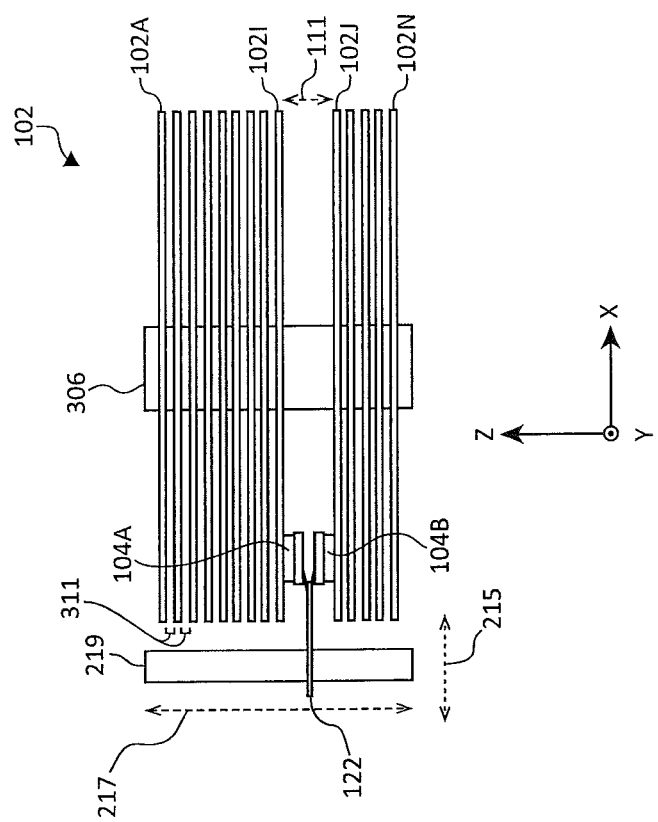
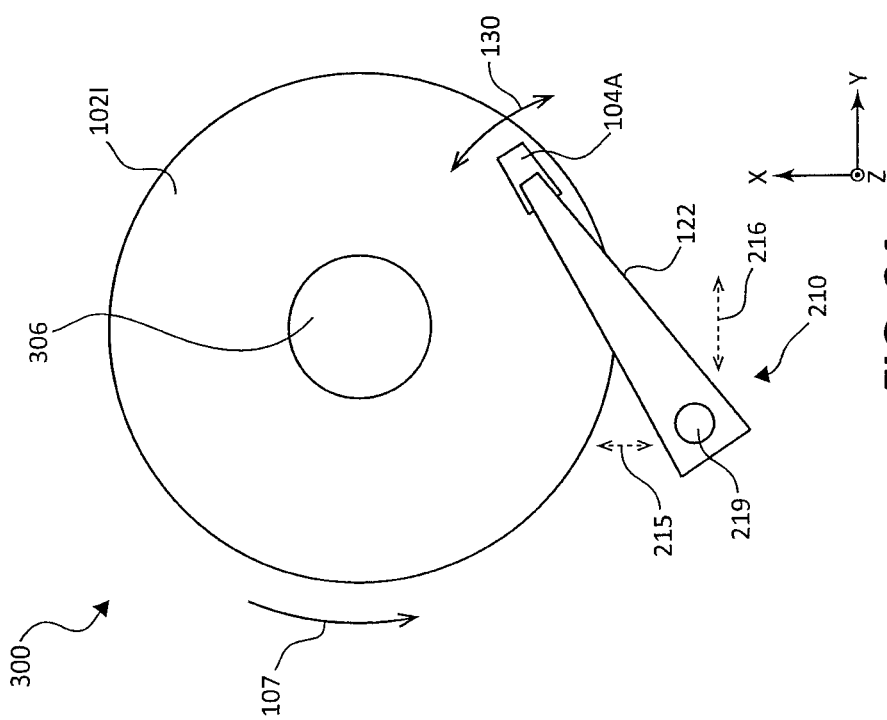
FIG. 3B
FIG. 3A

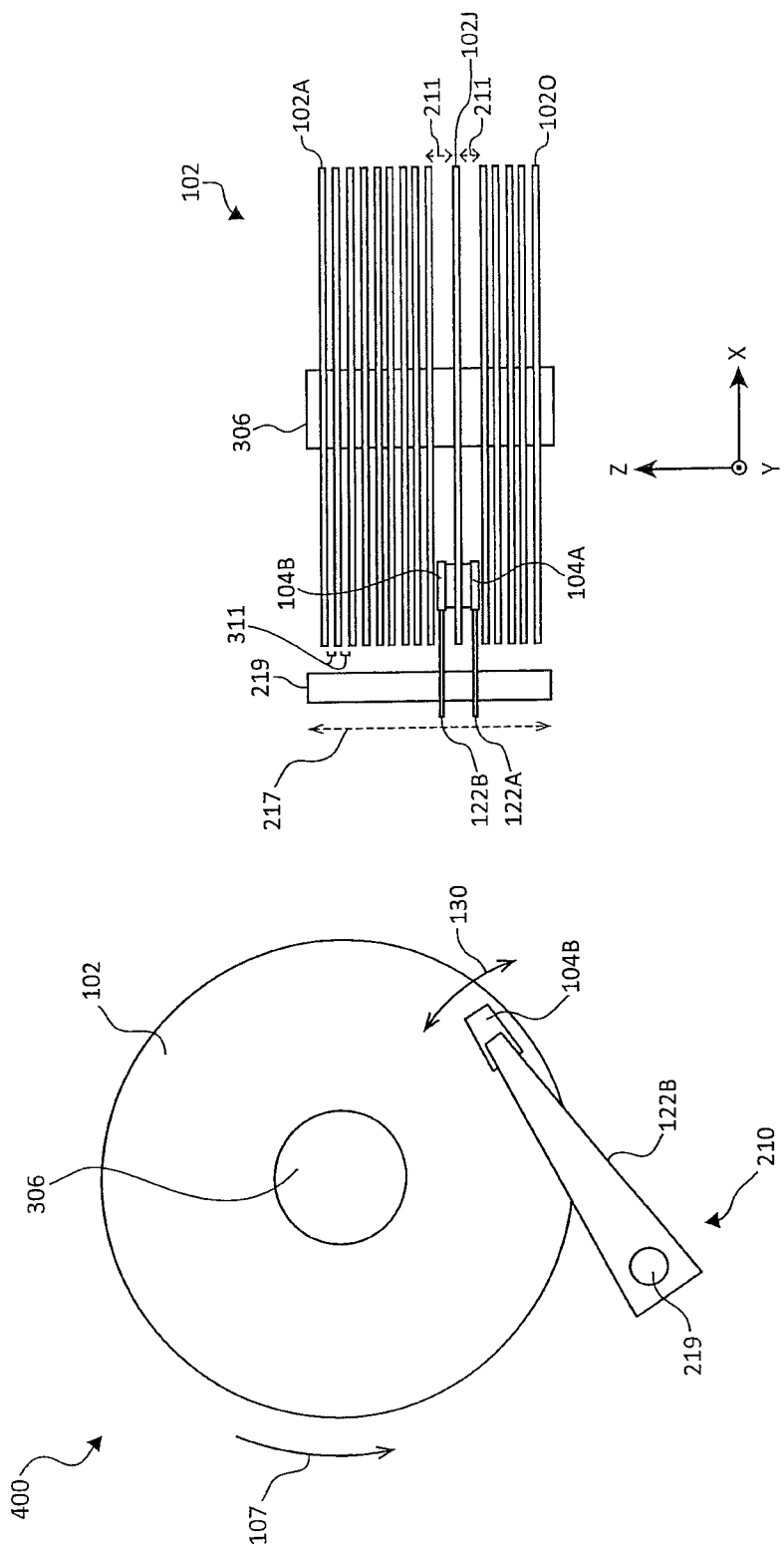

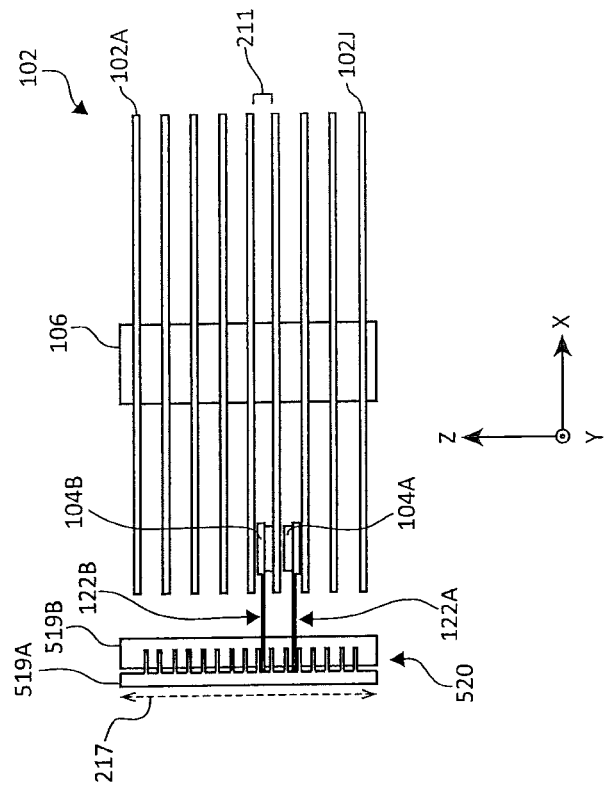
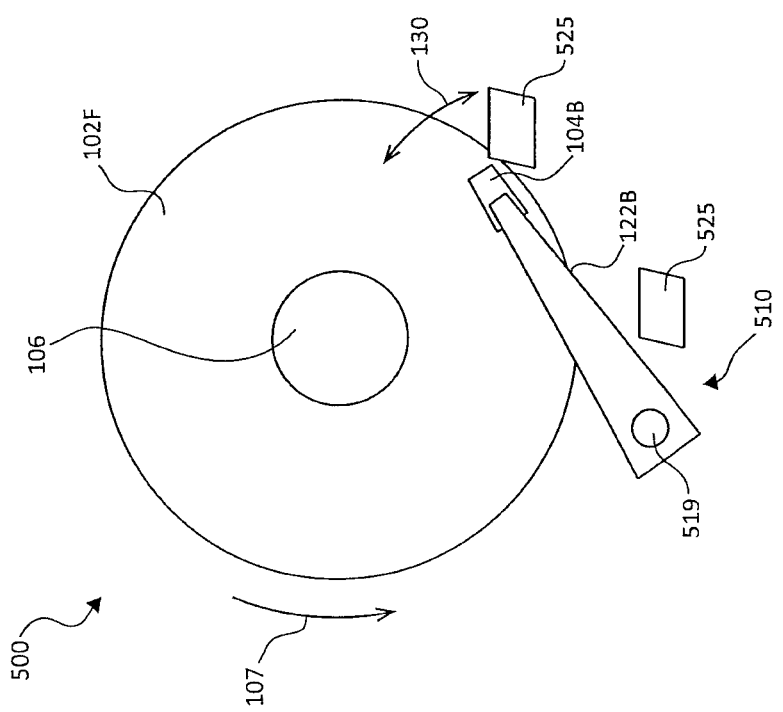
FIG. 5A
FIG. 5B

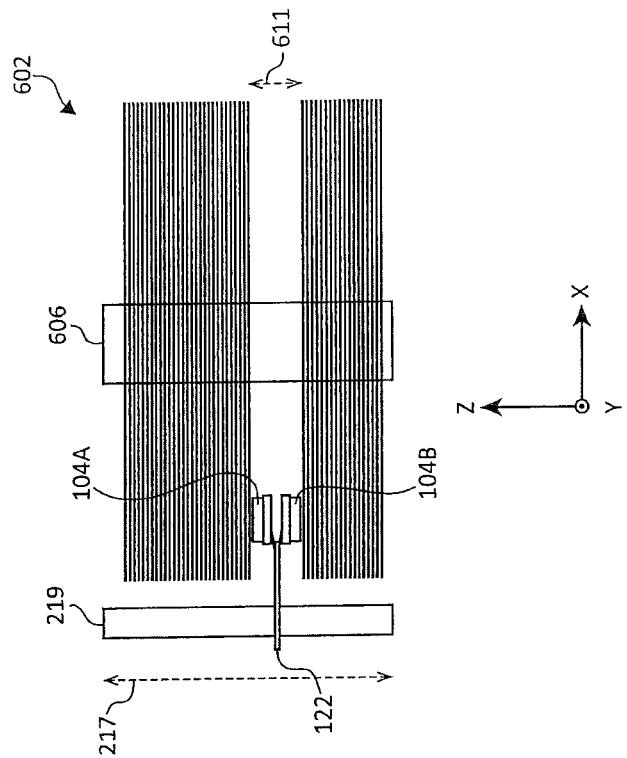
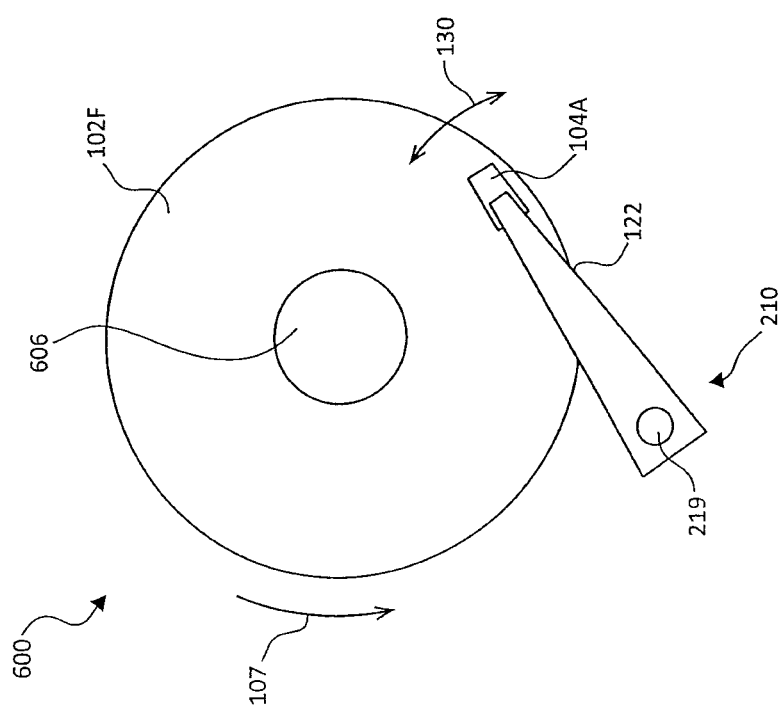
FIG. 6A
FIG. 6B

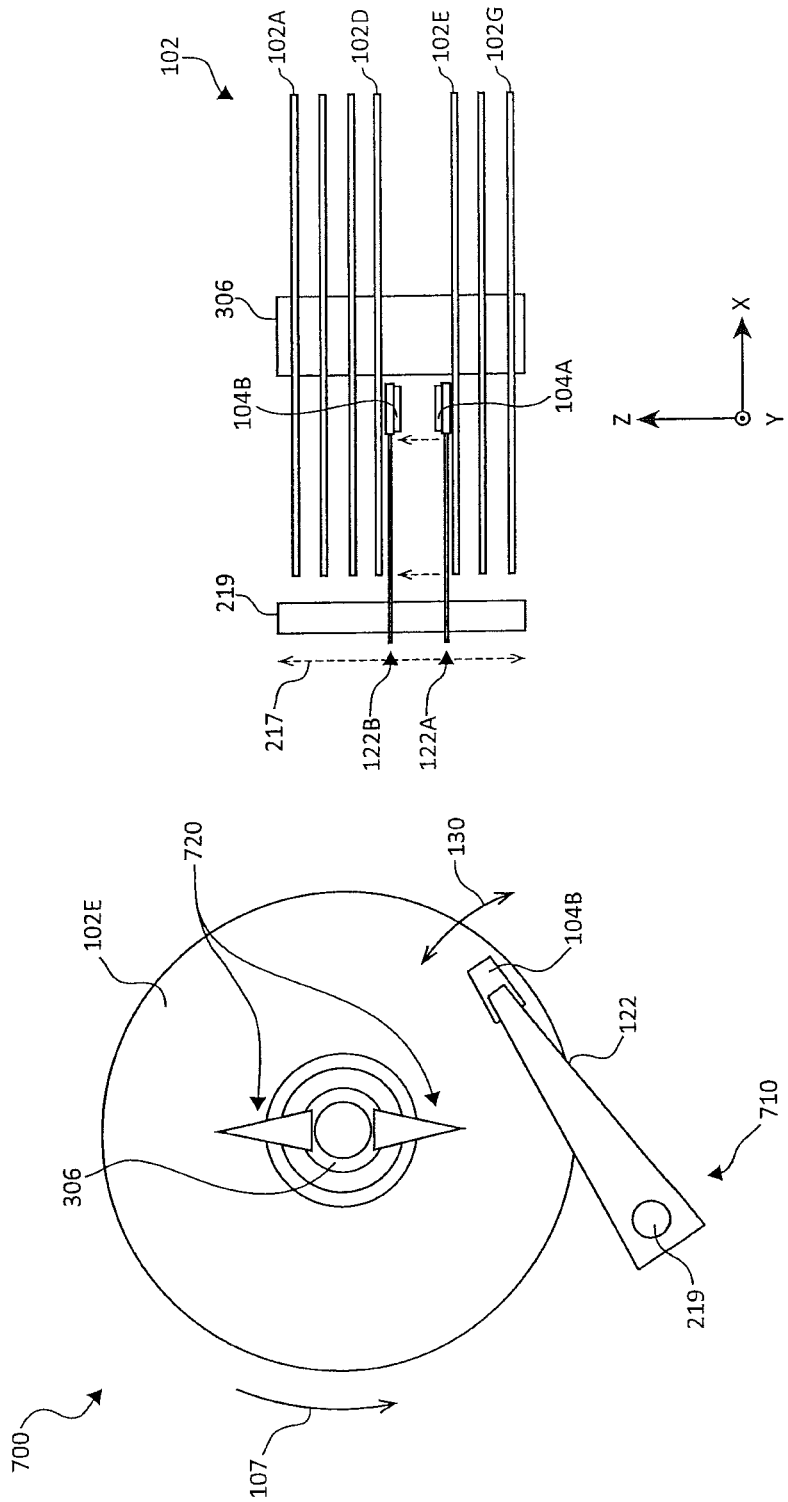

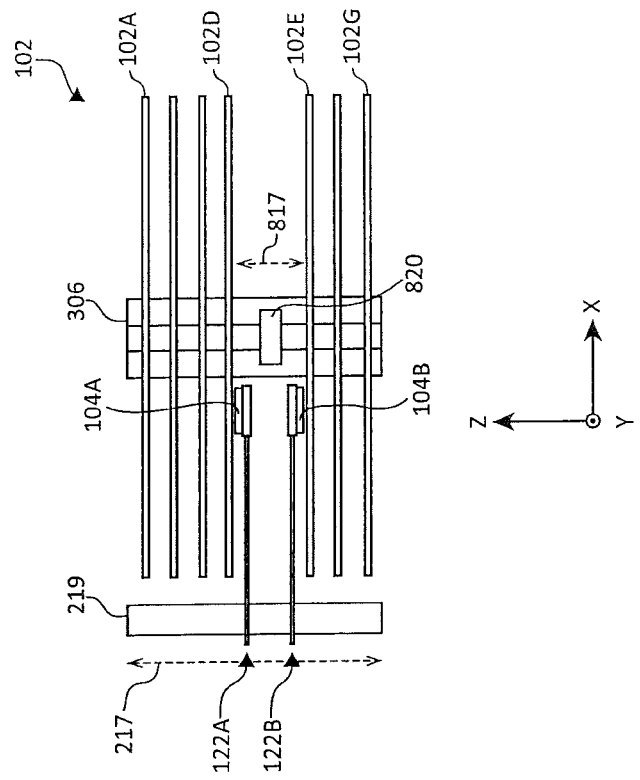
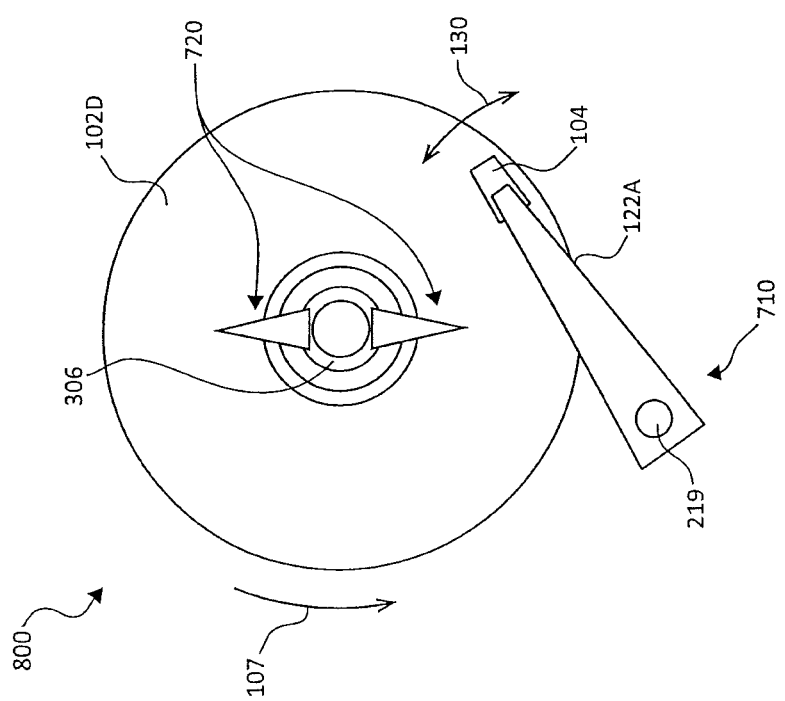
FIG. 8A
FIG. 8B

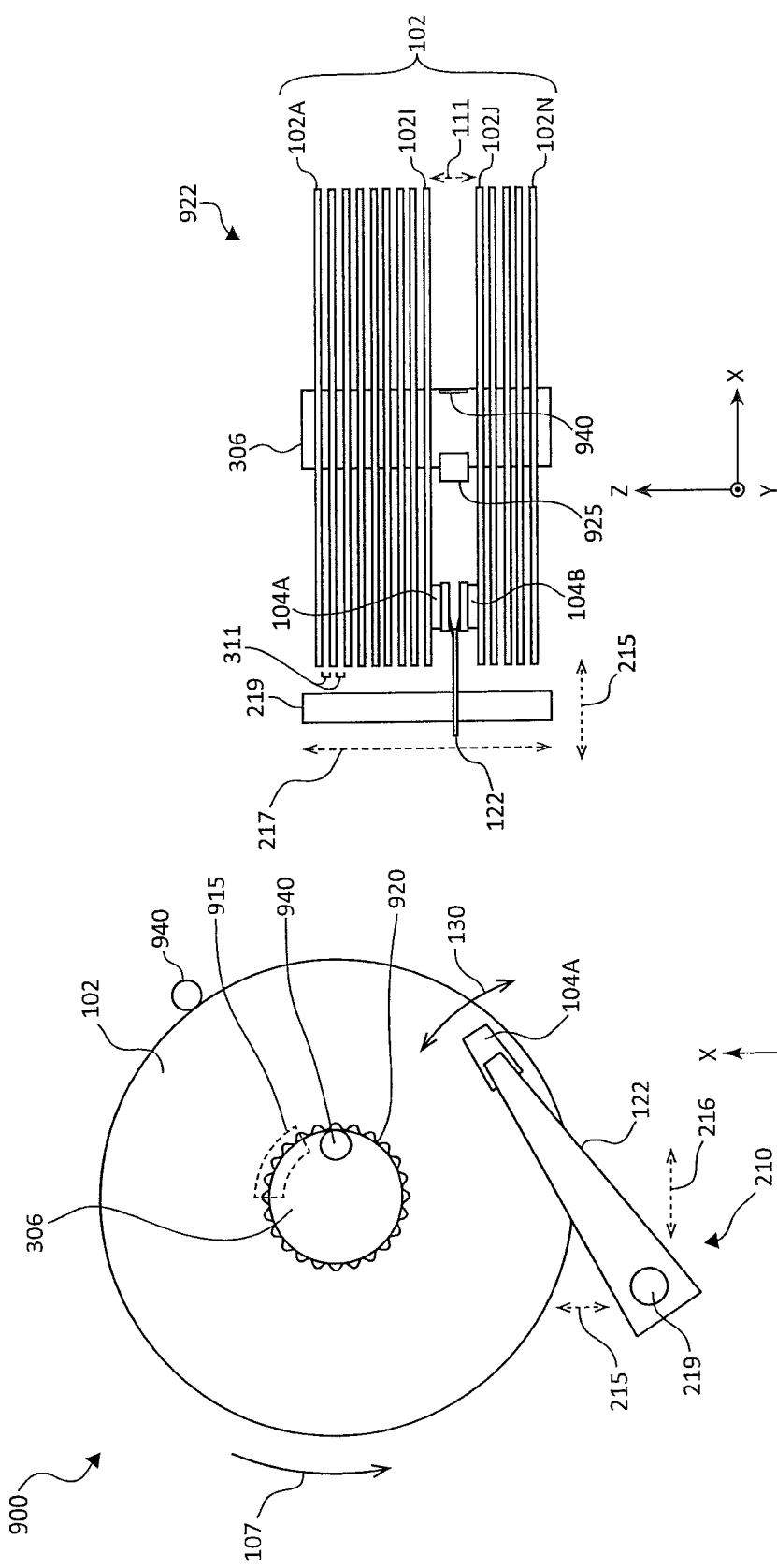

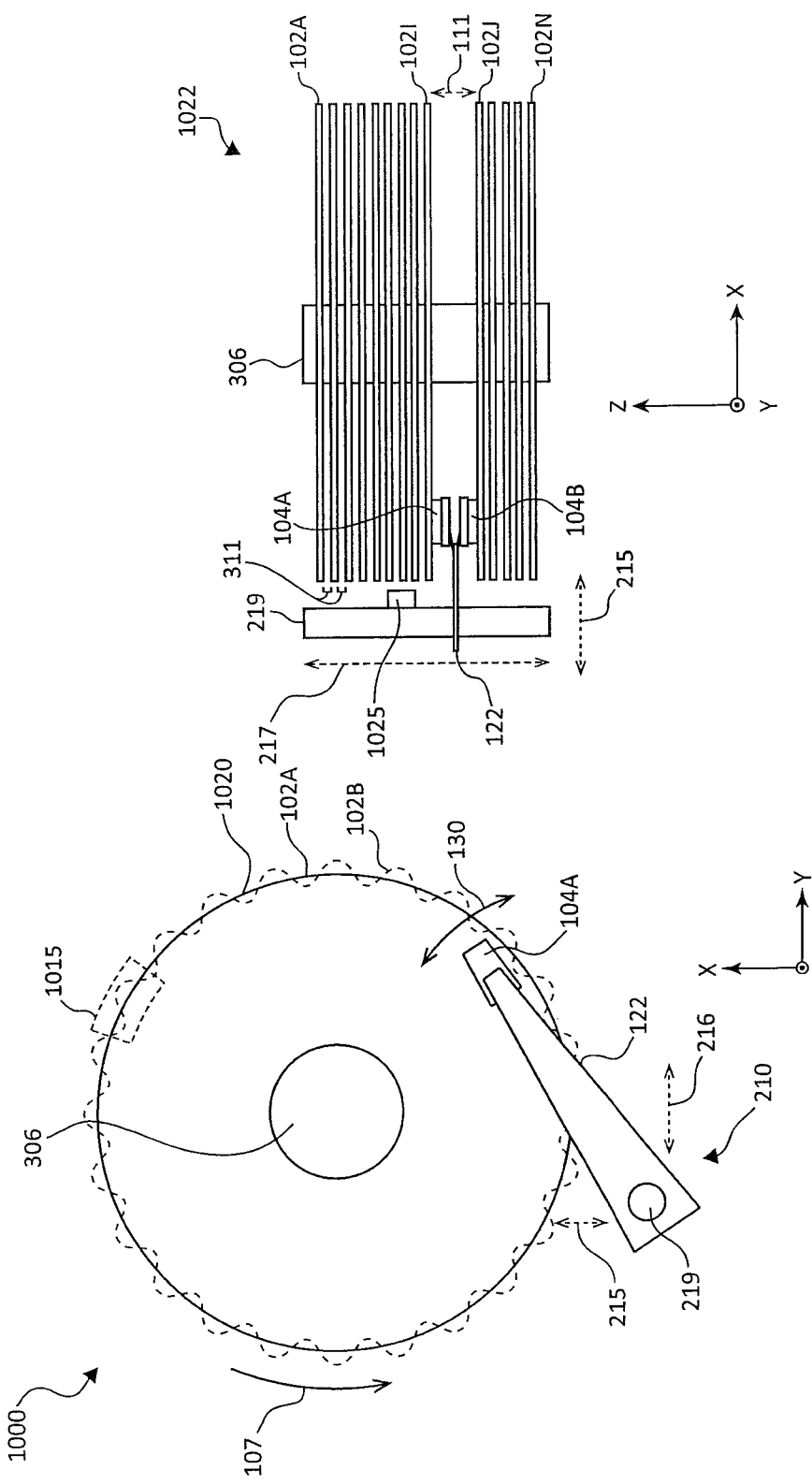

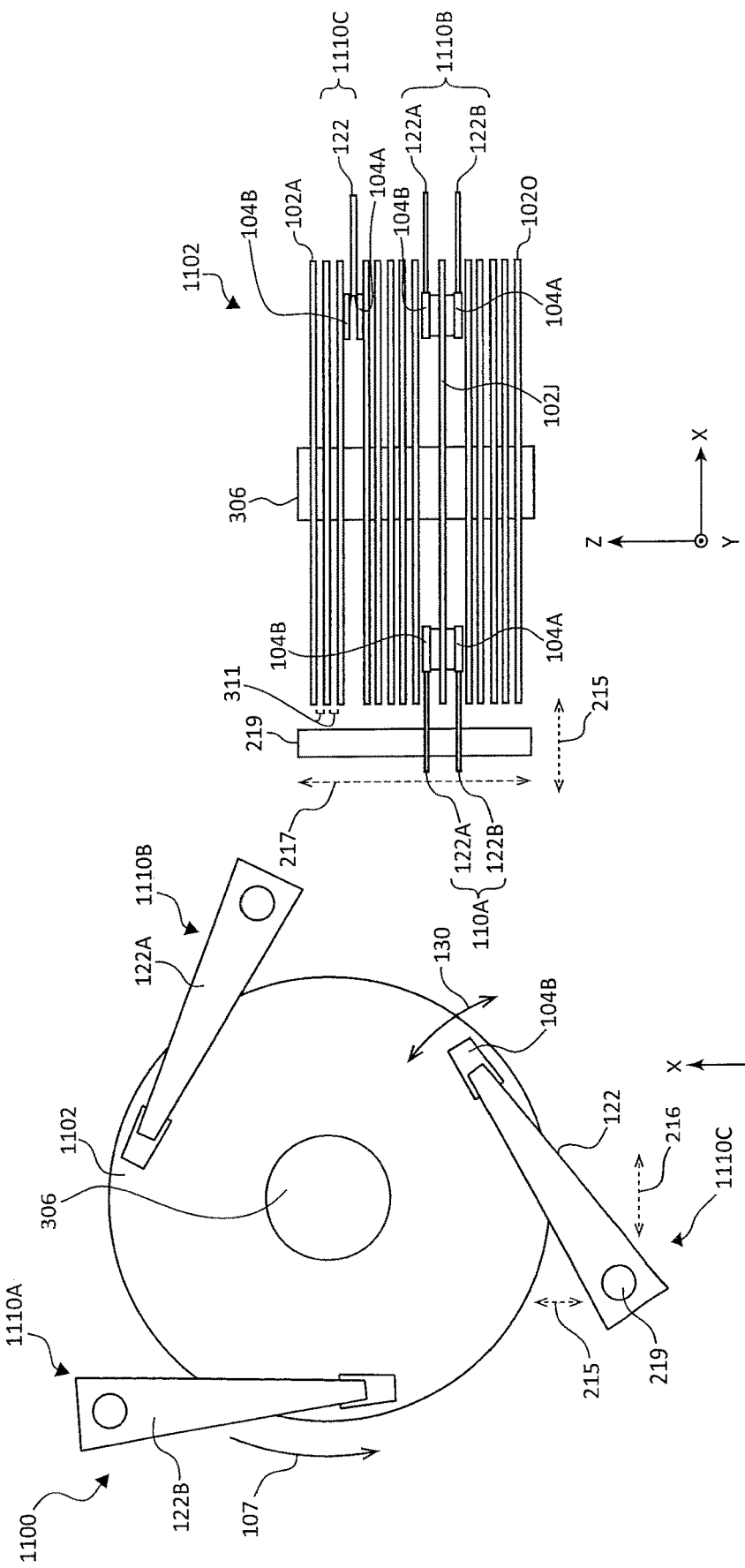

ASSEMBLY THAT ENABLES REDUCTION IN DISK TO DISK SPACING

CROSS-REFERENCE TO RELATED APPLICATION

This is a continuation-in-part of U.S. application Ser. No. 16/805,174, filed on Feb. 28, 2020, which published as U.S. Pub. No. 2020/0202891, on Jun. 25, 2020, which is a continuation-in-part of U.S. application Ser. No. 15/965,097, filed on Apr. 27, 2018, which issued as U.S. Pat. No. 10,811,045, on Oct. 20, 2020, the contents of which are hereby incorporated by reference in their entirety.

SUMMARY

In one embodiment, a data storage system includes a data storage foil mounted within the data storage system, the data storage foil has at least one data storage surface. The data storage system also includes a head configured to interact with the at least one data storage surface to carry out at least one of data read or data write operations.

In another embodiment, a method includes mounting a data storage foil having at least one data storage surface in a data storage system. The method also includes providing a head configured to interact with the at least one data storage surface to carry out at least one of data read or data write operations.

In yet another embodiment, a system includes a rotatable spindle, and a plurality of data storage foils mounted on the rotatable spindle. The system also includes an actuator mechanism with at least one actuator arm configured to translate, along a length of at least one axis, among the plurality of data storage foils. The system further includes a head supported on the at least one actuator arm, the head is configured to communicate with each data storage foil of the plurality of data storage foils.

BRIEF DESCRIPTION OF THE DRAWINGS

FIGS. 3A and 3B are schematic illustrations of a data storage device according to an embodiment of the disclosure.

FIGS. 4A and 4B are schematic illustrations of a data storage device according to an embodiment of the disclosure.

FIGS. 5A and 5B are schematic illustrations of a data storage device according to an embodiment of the disclosure.

FIGS. 6A and 6B are schematic illustrations of a data storage device according to an embodiment of the disclosure.

FIGS. 7A and 7B are schematic illustrations of a data storage device according to an embodiment of the disclosure.

FIGS. 8A and 8B are schematic illustrations of a data storage device according to an embodiment of the disclosure.

FIGS. 9A and 9B are schematic illustrations of a data storage device according to an embodiment of the disclosure.

FIGS. 10A and 10B are schematic illustrations of a data storage device according to an embodiment of the disclosure.

FIGS. 11A and 11B are schematic illustrations of a data storage device according to an embodiment of the disclosure.

DETAILED DESCRIPTION

Although the present disclosure has been described with reference to embodiments, workers skilled in the art will recognize that changes may be made in form and detail without departing from the scope of the disclosure. The present disclosure relates to reducing disk to disk spacing in data storage devices by using heads translatable among a plurality of disks in a disk drive. However, prior to providing additional detail regarding the different embodiments, a description of an illustrative operating environment is provided.

Figure 1B:
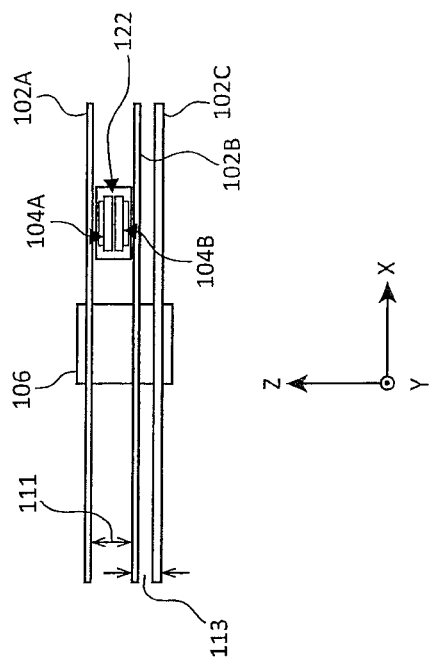
FIGS. 1A and 1B illustrate an example of a data storage device in which embodiments of the present application can be used.
Figure 1A:
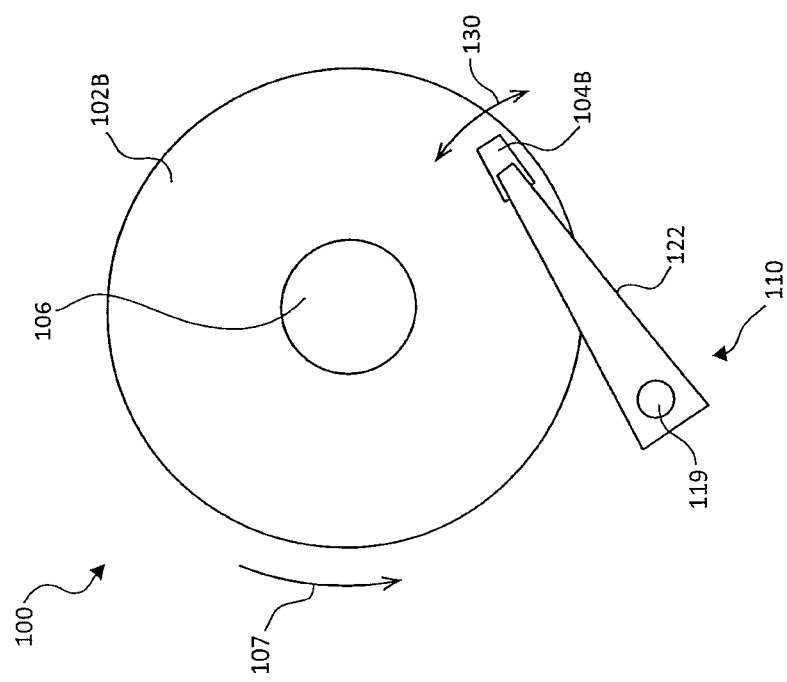

FIGS. 1A and 1B show an illustrative operating environment in which certain data storage device embodiments disclosed herein may be incorporated. The operating environment shown in FIGS. 1A and 1B is for illustration purposes. Embodiments of the present disclosure are not limited to any particular operating environment such as the operating environment shown in FIGS. 1A and 1B. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIGS. 1A and 1B are schematic illustrations of a data storage device (e.g., a hard disk drive or Hard Disk Drive (HDD)) 100 including data storage media or disks 102A and 102B, heads 104A and 104B for reading data from and/or writing data to the data storage media, and an actuator mechanism to position the heads 104A and 104B. FIG. 1A illustrates a top view of a portion of data storage device 100 and includes lower data storage material, or storage media 102B, e.g., second recording disk 102B and a down or downward-facing head 104B. The down head 104B including transducer elements (not shown) is positioned above the data storage media 102B to read data from and/or write data to the disk 102B. In the embodiment shown, the disk 102B represents a rotatable disk or other storage media that include one or more magnetic, optical or other storage layers. For read and write operations, a spindle motor 106 rotates the media 102B (and medium or disk 102A shown in FIG. 1B) as illustrated by arrow 107 and an actuator mechanism 110 positions the down head 104B relative to data tracks on the disk 102B. The head 104B is coupled to an arm 122 of the actuator mechanism 110. In the interest of simplification, arm 122 is shown as a single element to which head 104B is coupled. However, in some embodiments, head 104B may be coupled to actuator mechanism 110 through a suspension assembly (not shown) which may include a load beam (not shown) coupled to actuator arm 122 of the actuator mechanism 110, for example through a swage connection. Although FIG. 1A illustrates a single arm 122 coupled to the actuator mechanism 110, additional arms 122 can be coupled to the actuator mechanism 110 to support heads that read data from or write data to multiple disks of a disk stack. The actuator mechanism 110 is rotationally coupled to a frame or deck (not shown) to rotate about a pivot shaft 119. Rotation of the actuator mechanism 110 moves the head 104B in a cross-track direction as illustrated by arrow 130 and enables movement between an inner diameter (ID) and an outer diameter (OD) of the disk.

FIG. 1B illustrates a side view of the data storage device 100. FIG. 1B illustrates first or upper disk 102A and second or lower disk 102B coupled to spindle motor 106 and separated by a disk to disk space 111. FIG. 1B further illustrates up head 104A coupled to actuator arm 122 facing upwards towards the bottom surface of the first disk 102A, and down head 104B (also shown in FIG. 1A) facing downwards towards the top surface of the second disk 102B. In some embodiments, heads 104A and 104B may be coupled to actuator arm 122 by a load beam. The heads 104A and 104B may be moved by actuator mechanism 110. Up head 104A may read data from and/or write data to the storage material on the bottom of disk 102A, and down head 104B may read data from and/or write data to the storage material on the top of disk 102B.

As data storage increases, the volumetric density of data storage devices becomes an ever-greater concern when compared to areal density. One method of increasing volumetric density in an HDD involves reducing the disk to disk spacing between the data storage media or disks. Reducing disk to disk spacing may enable an increased number of disks to be stacked within a similar disk stack volume.

This disclosure generally describes apparatus and methods of decreasing the disk to disk spacing by using a fewer heads than disks in the data storage device. In such embodiments, a same head or two heads may read from and/or write to different disks at different times. A separation distance between disk or disk surfaces that are not being currently read from or written to may be relatively small (e.g., 113 between disks 102B and 102C). To accommodate the same head or the two heads for a read/write operation, a spacing between two disks may be temporarily increased to, for example, 111 in FIG. 1B. As will be described in detail further below, in such embodiments, an actuator mechanism with a single head or two heads including an up head and a down head are provided with the ability to move up and down on the Z axis to different disks in the disk stack. By utilizing a single set of heads with the ability to move up and down the Z axis to different disks in a stack, the volume of the disk stack and the cost for heads is reduced. Reducing the disk to disk spacing increases the volumetric density and therefore disk to disk space may be saved. This volumetric density has the potential to convert, for example, a current eight-disk design into an eleven-disk design within the same form factor.

Figures 2A, 2B:
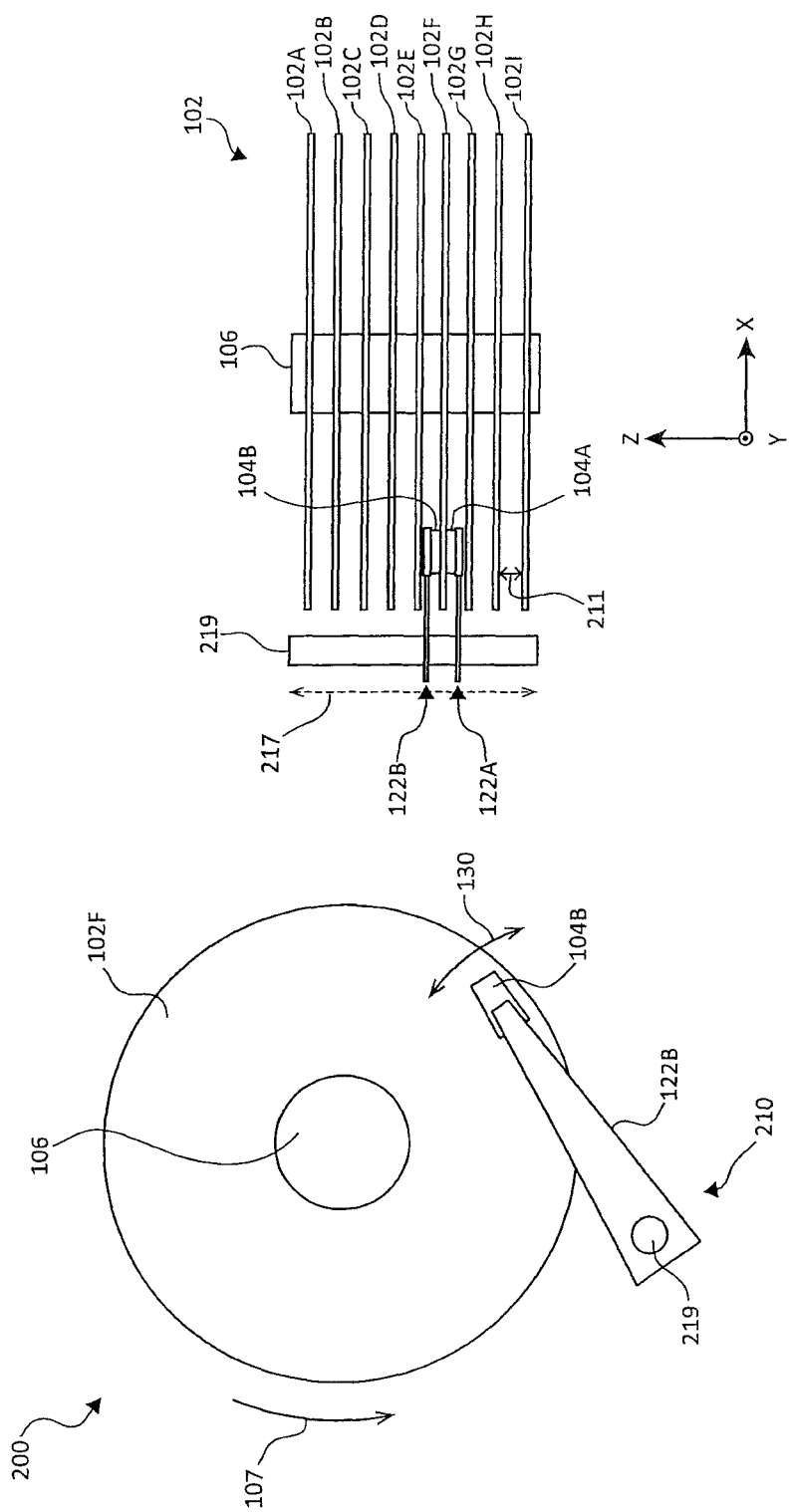
FIGS. 2A and 2B are schematic illustrations of a data storage device according to an embodiment of the disclosure.

FIGS. 2A and 2B are schematic illustrations of a data storage device 200 that employs two heads, including an up head and a down head which may be vertically translated on the Z axis between a plurality of disks according to an embodiment of the disclosure. FIGS. 2A and 2B incorporate similar elements from FIGS. 1A and 1B, such that FIG. 2A illustrates a top view of a portion of data storage device 200 and includes data storage medium or disk 102F and down head 104B.

In the embodiment shown, the down head 104B and up head 104A (seen in FIG. 2B) are provided on an actuator mechanism 210 to position the heads 104A and 104B relative to the data tracks on disk 102F. Up head 104A is coupled to actuator arm 122A and down head 104B is coupled to actuator arm 122B. The heads 104A and 104B may also be coupled to the actuator mechanism 210 through a suspension assembly which may include a load beam (not shown) coupled to actuator arm 122A, 122B of the actuator mechanism 210. Actuator arms 122A and 122B are mounted on pivot shaft 219, respectively, to provide rotation in a cross-track direction as illustrated by arrow 130. Thus, for read and write operations, a spindle motor 106 rotates the disk 102F (as well as disks 102A-102I seen in FIG. 1B) as illustrated by arrow 107 and actuator mechanism 210 positions the heads 104A and 104B relative to data tracks on the disk 102F in a cross-track motion as illustrated by arrow 130.

FIG. 2B illustrates a side view of the data storage device 200. FIG. 2B illustrates a nine-disk stack with a first or topmost disk 102A, to a ninth or bottommost disk 102I coupled to spindle motor 106 and separated by disk to disk space 211. As can be seen, disk to disk space 211 provides disk separation allowing for a single head 104A, 104B between disks 102. Thus, disk to disk space 211 is smaller than disk to disk space 111 of FIG. 1B, which reduces disk to disk spacing on the Z axis in a disk stack overall. Although nine disks are illustrated in the disk stack, this is exemplary only, and a plurality of disks may be used in a data storage device according to the disclosure.

FIG. 2B further illustrates up head 104A on actuator arm 122A facing upwards towards the bottom surface of disk 102F and down head 104B on actuator arm 122B facing downwards towards the top surface of disk 102F. The heads 104A and 104B may be moved by actuator mechanism 210. Actuator arms 122A and 122B of heads 104A and 104B are coupled to pivot shaft 219 and may be translatable vertically along the Z axis as illustrated by arrow 217. Actuator mechanism 210, therefore, enables heads 104A and 104B to translate vertically in the Z axis, e.g., along arrow 217, to any disk 102 in a disk stack as well as to rotate in cross track motion along arrow 130.

Actuator mechanism 210 enables the arms 122A and 122B to rotate and translate to allow head 104A and 104B to communicate with the data storage material or storage media on any disk of a disk stack. For example, up head 104A may read data from and/or write data to the storage material on the bottom of disk 102A, and down head 104B may read data from and/or write data to the storage material on the top of disk 102A. This action may be carried out by first rotating heads 104A, 104B in a cross-track direction away from their current position by translating heads 104A, 104B until they are off their current disk, e.g., 102F. Then, actuator mechanism 210 may translate heads 104A and 104B vertically on the Z axis (as indicated by arrow 217) until they have reached the selected disk, e.g., 102A. Actuator mechanism 210 may then rotate heads 104A and 104B in a cross-track direction until heads 104A and 104B are in communication with the data storage material of disk 102A. Although FIGS. 2A and 2B illustrate a nine-disk stack, these illustrations are exemplary only, and a data storage device may be provided with a plurality of data storage media with reduced disk to disk spacing according to embodiments of the present disclosure.

FIGS. 3A and 3B are a schematic illustration of a data storage device 300 that employs a single set of up and down heads according to an embodiment of the disclosure. FIGS. 3A and 3B incorporate similar elements from FIGS. 2A and 2B, such that FIG. 3A illustrates a top view of a portion of a data storage device 300 and includes a data storage medium or disk 102 and an up head 104A.

FIGS. 3A and 3B illustrate an embodiment of the present disclosure wherein the disks 102 coupled to a spindle motor 306 may be translatable vertically along the Z axis as illustrated by arrow 217. Similarly, to FIGS. 1A and 1B, in FIG. 3B up head 104A and down head 104B are coupled to actuator arm 122 such that 104A faces upwards towards the bottom surface of a disk 102I, and down head 104B faces downwards towards the top surface of a disk 102J. Similar to FIGS. 2A and 2B, actuator arm 122 is coupled to pivot shaft 219 and may be translatable vertically along the Z axis as illustrated by arrow 217 or horizontally in a direction along the X axis and/or Y axis, as illustrated by arrows 215 and 216 respectively. Actuator mechanism 210, therefore, enables heads 104A and 104B to translate vertically along arrow 217 in the Z axis to any disk 102 in a disk stack as well as to rotate in cross track motion along arrow 130. Translating along the X axis and Y axis enables heads 104A and 104B to have an adjustable position on a disk 102 in the disk stack.

FIG. 3B illustrates an embodiment where data storage device 300 may further increase volumetric capacity by allowing disks 102 to translate vertically and decrease their relative disk spacing to a disk to disk spacing 311. Spindle motor 306 enables disks 102 to translate vertically along arrow 217 in the Z axis, such that disks 102 may increase or decrease their relative disk to disk spacing. Disk to disk spacing 311 may be less than disk to disk spacing 211 of FIG. 2B. Therefore, by employing a single set of up and down heads, heads 104A, 104B may occupy a disk to disk space 111, such as between disks 102I and 102J, and the remaining disks 102 of the disk stack may occupy a reduced disk to disk spacing 311.

Actuator mechanism 210 in cooperation with spindle motor 306 enables the heads 104A and 104B to communicate with the data storage material on any disk of a disk stack, while keeping a reduced disk to disk spacing 311. For example, if heads 104A and 104B are to read data from and/or write data to data storage material of a disk they are not currently aligned with, e.g., disk 102I or 102J, actuator mechanism 210 may rotate arm 122 in a cross-track motion by arrow 130 until heads 104A and 104B are off the disk. Disks 102 may then translate vertically on the Z axis (as indicated by arrow 217) on spindle 306 until disks 102 have opened a disk to disk spacing 311 to allow heads 104A and 104B to communicate with the appropriate data storage media. Actuator mechanism 210 may translate heads 104A, 104B vertically on the Z axis (as indicated by arrow 217) until they have reached the selected disk, and then rotate heads 104A and 104B in a cross-track direction until heads 104A and 104B are in communication with the appropriate data storage material.

Although FIGS. 3A and 3B illustrate a fourteen-disk stack, these illustrations are exemplary only, and a data storage device may be provided with a plurality of data storage media with the ability to provide reduced disk to disk spacing according to embodiments of the disclosure. Further, while FIGS. 3A and 3B illustrate a data storage device 300 with arm 122 coupled to heads 104A, 104B, a plurality of arms 122 (e.g., 122A or 122B of FIG. 2B) may be used in conjunction with spindle motor 306 for moving disks 102 in a vertical direction.

Data storage device 300 includes heads 104A and 104B placed between two disks, e.g., disks 102I and 102J, which will both rotate about spindle motor 306 in direction of arrow 107 when in use. However, the remaining disks 102 not in communication with heads 104A and 104B may remain stationary if so desired. In an example where disks 102 not in communication remain stationary, power consumption of device 300 may be reduced.

FIGS. 4A and 4B illustrate an embodiment of the present disclosure similar to FIGS. 3A and 3B, wherein the disks 102 coupled to spindle motor 306 may be translatable vertically along the Z axis as illustrated by arrow 217. Similar to FIG. 2B, up head 104A is coupled on actuator arm 122A facing upwards towards the bottom surface of an engaged disk, e.g., 102J, and down head 104B is coupled to actuator arm 122B facing downwards towards the top surface of the engaged disk, e.g., disk 102J. The heads 104A and 104B may be moved by actuator mechanism 210. Thus, disks 102 may translate vertically along spindle 306 to enable heads 104A, 104B to selectively engage any disk 102 to read data from and/or write data to the storage material on the bottom of disk. In one example, only one disk, e.g., 102J, is in motion and engaged by the heads 104A and 104B to allow communication with the storage material on the top and bottom of the disk 102. Data storage device 400 provides an example of an embodiment of the present disclosure when the disks 102 not engaged by the heads 104A and 104B may remain stationary to further reduce power consumption.

FIGS. 5A and 5B illustrate an embodiment of the present disclosure similar to FIGS. 2A and 2B and includes an alignment and positioning system of actuator mechanism 510. FIGS. 5A and 5B illustrates up head 104A on actuator arm 122A facing upwards towards the bottom surface of disk 102F and down head 104B on actuator arm 122B facing downwards towards the top surface of disk 102F. The heads 104A and 104B may be moved by actuator mechanism 510. Actuator arms 122A and 122B of heads 104A and 104B are coupled to an alignment system 520, e.g., pivot shaft 519, and may be translatable vertically along the Z axis as illustrated by arrow 217.

An apparatus for improving alignment and positioning of the heads may include alignment combs and a ramp load mechanism. Arms 122A and 122B may be coupled to alignment system 520 to position heads 104A, 104B with a disk, e.g., 102F of the disk stack. Alignment system 520 may include a first alignment comb 519A with protrusions and a second alignment comb 519B with corresponding receivers to translate the heads 104A and 104B vertically along the Z axis as illustrated by arrow 217 and align with the disks 102. Actuator mechanism 510, therefore, enables heads 104A and 104B to translate vertically along arrow 217 in the Z axis to any disk 102 in a disk stack as well as to rotate in cross track motion along arrow 130. A ramp load mechanism 525 may be included adjacent to the disk stack to aid in loading or unloading the heads 104A, 104B from the disks 102. As can be seen, disk to disk space 211 provides disk separation allowing for a single head between disks 102. Although FIGS. 5A and 5B illustrate an example of a data storage device wherein the disks 102 do not move in a vertical direction on the Z axis, data storage device 500 may include vertical disk movement (e.g., spindle motor 306 of FIG. 3 or 4) with features such as actuator mechanism 510, alignment system 520, or ramp load mechanism 525.

Further, the embodiments shown illustrate devices using a single pair of up and down heads, but these illustrations are exemplary only, and a data storage device may use a plurality of up and down heads in a variety of combinations with the features described herein. For example, multiple heads 104 may be set up in a similar configuration to access different disks 102 simultaneously. Possibilities include using a plurality of actuator mechanisms, e.g., actuator mechanism 210, or a plurality of actuator arms, e.g., actuator arm 122, to support a plurality of heads 104. Multiple heads 104 may be included on the same actuators to use the same cross-stroke, e.g., along cross disk arrow 130, and vertical direction, e.g., translated vertically along the Z axis as illustrated by arrow 217. Multiple heads may also use different actuators to act independently and engage different disks, or different storage material on the same disk, simultaneously.

Actuator mechanisms may use a variety of formats to translate heads 104A and 104B vertically along the Z axis as illustrated by arrow 217. These vertical actuator formats may include, but are not limited to, magnetic lift systems, pully systems, or worm gear systems. Actuator mechanisms may also include a clutch mechanism to provide further alignment precision and to maintain the position of the heads 104. Alternatively, actuators may include an intrinsic clutch to provide alignment and stability for the heads.

FIGS. 6A and 6B illustrate an embodiment of the present disclosure using magnetic film coated foil to increase volumetric density. Similar to FIGS. 3A and 3B, data storage device includes actuator arm 122 coupled to pivot shaft 219 such that actuator mechanism 210 enables heads 104A and 104B to translate vertically along arrow 217 in the Z axis as well as to rotate in cross track motion along arrow 130. FIGS. 6A and 6B illustrate a data storage device 600 in which the data storage media are a plurality of foils 602 coated with magnetic film. A spindle motor 606 rotates the media 602 as illustrated by arrow 107 and actuator mechanism 210 positions the heads 104A and 104B relative to data tracks on the storage media 602. Heads 104A and 104B may communicate with foils 602 with magnetic film for reading data from and/or writing data to the data storage media. Foils 602 with magnetic film may provide a much thinner data storage media, as compared to disks, such as disks 102. Spindle motor 606 enables storage media 602 to translate vertically along arrow 217 in the Z axis, such that storage media 602 may increase or decrease their relative spacing, similar to disk to disk spacing 111.

As seen in FIG. 6B, heads 104A and 104B may be positioned between foils 602 to communicate with the magnetic media of a bottom portion of a foil and a top portion of a foil respectively and have a spacing 611 similar in size to disk to disk spacing 111 to accommodate the heads 104A, 104B in the vertical or Z axis. As the foils 602 are rotated by spindle motor 606, the foils 602 remain rigid, and the foils 602 not engaged by heads 104 may become closely spaced due to centrifugal force. Thus, because foils 602 with magnetic film are thinner than disks 102, and may be more closely spaced than disks 102, they may greatly increase the volumetric density of a data storage device.

A variety of methods may be used to translate storage media up and down in a vertical Z axis, such as by arrow 217. FIGS. 7A and 7B illustrate an embodiment of data storage device 700 using a head-based disk movement system. FIGS. 7A and B illustrate disks 102 coupled to spindle motor 306 and an actuator mechanism 710 to position the heads 104A, 104B relative to the data tracks on the disks 102. Up head 104A is coupled to actuator arm 122A and down head 104B is coupled to actuator arm 122B. Clamp system 720 is provided to keep disks 102 in place when not in translation vertically along the Z axis. As seen in FIG. 7B, a head-based disk translation system is used to move disks 102 to their respective positions, such that a head 104 may be positioned by actuator mechanism 710 to an ID of disk 102 and then arm 122 may be moved or translated upwards or downwards according to arrow 217 to push the disks 102 up or down along spindle 306. For example, actuator arm 122B may be inserted between disk 102D and disk 102E and then translated upwards along pivot shaft 219 to maneuver disk 102D to its respective position on spindle 306. Once disks 102 are in place, clamp system 720 maintains the disks 102 in their respective position.

FIGS. 8A and 8B illustrate an embodiment of data storage device 800 using a spindle shaft-based disk movement system. Similar to FIGS. 7A and 7B, disks 102 are coupled to spindle motor 306 and an actuator mechanism 710 to position the heads 104A and 104B relative to the data tracks on the disks 102. Up head 104A is coupled to actuator arm 122A and down head 104B is coupled to actuator arm 122B. Clamp system 720 is provided to keep disks 102 in place when not in translation vertically along the Z axis. Spindle motor 306 is configured with an inner shaft 820 to move disks 102 into position. For example, to provide head 104 access with storage media on disks 102D and 102E, inner shaft 820 on spindle motor 306 may position disk 102D upwards and disk 102E downwards along arrow 817, and clamp system 720 may then maintain the disks 102 in their respective positions. Actuator mechanism 710 may then translate arms 122A and 122B vertically along arrow 217 in the Z axis as well as to rotate arms 122A and 122B in cross track motion along arrow 130 to position heads 104A and 104B for reading data from and/or writing data to the data storage media.

FIGS. 9A and 9B illustrate an embodiment of a data storage device 900, shown to be similar to FIGS. 5A and 5B, and includes an ID feature 915 on an ID 920 of disk 102. ID feature 915 may, as a non-limiting example, be ridges, a sinusoidal wave, a square wave, a particular series of shapes, coordinates or a combination thereof. Further, ID feature 915 may be etched or printed on ID 920 or may be cut into ID 920 continuously around ID 920 or may cover a selected portion of ID 920. ID feature 915 may be symmetrical or asymmetrical about the X axis of disk 102. Each disk 102 may have its own unique or individualized ID feature 915 different from the other disks in disk stack 922. By way of a non-limiting example, ID feature 915 of disk 102I may be different from ID feature 915 of disk 102J.

Spindle motor 306 may be arranged inside a perimeter of ID 920 and configured with an access mechanism 925. Alternatively, access mechanism 925 may be arranged separate but adjacent to spindle motor 306. Access mechanism 925 may be keyed with a shape or feature that matches or coordinates with feature 915. This may allow access to and isolate a specified or identified single disk in order to separate it from at least one neighboring disk. Access mechanism 925 may be matched or keyed to the identified disk and positioned at the identified disk in order to clip or grab the identified disk 102. The shape of access mechanism 925 may be changed to match a different ID feature 915 by using an external program which is configured to send a signal to the access mechanism 925 with the assigned shape that corresponds to the identified disk. By way of a non-limiting example, disk 102J may be marked as the identified disk. Disk 102J may be separated from neighboring disk 102I and/or disk 102K by moving disk 102J either up or down. To move disk 102J, access mechanism 925 is matched or keyed to feature 915 on disk 102J. Access mechanism 925 latches or grabs onto disk 102J and moves disk 102J to a selected or different vertical location along the spindle motor 306, thereby separating disk 102J from disk 102I and/or 102K. Because access mechanism 925 is keyed to feature 915 on disk 102J, disk 102J, as the identified individual disk, may be selectively isolated from the neighboring disks.

Further, more than one disk 102 may be moved by access mechanism 925. A plurality of access mechanisms 925 may move a corresponding number of disks 102. Alternatively, a single access mechanism may move a plurality of disks 102 separately.

In addition to, or instead of, access mechanism 925, the spindle motor 306 includes at least one air diverter 940 used to aid in separating disks 102 of disk stack 922. Air diverter 940 may be positioned at ID 920 on the spindle and/or an OD 930 of disk stack 922. Air diverter 940 provides a puff or flow of air separating one disk from another, thereby providing space for access mechanism 925 to latch onto disk 102 and move disk 102 to the desired location. In an alternative embodiment, air diverter 940 provides space for arm 122 to be inserted between disks without the use of access mechanism 925.

FIGS. 10A and 10B illustrates an embodiment of a storage device 1000 which is an alternative of storage device 900, as shown in FIGS. 9A and 9B. Instead of, or in addition to, ID 920 having feature 915, OD 1020 of disk 102 has an OD feature 1015. OD feature 1015, as a non-limiting example, comprises the same shape or structure as that listed in conjunction with ID feature 915. As illustrated in FIG. 10A, disk 102A has a different OD feature 1015 than disk 102B. By way of example, disk 102A has a smooth OD feature 1015 and disk 102B has a sinusoidal OD feature 1015 indicated by the dashed line in FIG. 10A. Each of the subsequent disks, likewise, have a unique or different OD feature 1015. OD feature 1015 may be continuous around OD 1020 or may only cover a portion of OD 1020. Further, OD feature 1015 may be symmetrical or asymmetrical about the Z axis of disk 102. The OD feature 1015 provides a unique signature for an access mechanism 1025 to latch onto the disk.

In an embodiment, access mechanism 1025 is arranged at the OD 1030 of disk 102 as part of actuator mechanism 210. Alternatively, access mechanism 1025 is arranged as a separate structure adjacent to OD 1030. Access mechanism 1025 is keyed with a shape or feature that matches or coordinates with feature 1015. This may allow access mechanism 1025 to access and isolate specified single disk in order to separate it from at least one neighboring disk. As with the embodiment discussed in relation to FIGS. 9A and 9B, access mechanism 1025 is positioned at the matching disk in order to clip or grab the specified disk 102, thereby separating the specified disk from at least one of the neighboring disks.

FIGS. 11A and 11B illustrate an embodiment of storage device 1100 comprising, as a non-limiting example, actuator mechanisms 1110A, 1110B and 1110C, although storage device 1100 may include more or less actuator mechanisms. Each of actuator mechanisms 1110A, 1110B and 1110C may include at least one actuator arm 122 coupled to at least one head 104A and 104B. By way of a non-limiting example, actuator mechanisms 1110A and 1110B may be configured similar to that illustrated in FIG. 4B, each having a first actuator arm 1122A and a second actuator arm 1122B. Actuator mechanism 1110C is shown to have a different configuration to indicate that the arm arrangement need not be the same. As illustrated, actuator mechanism 1110C is configured similar to that illustrated in FIG. 3B having a single arm 122 with two heads 104A and 104B. While FIG. 11B is illustrated to show actuator mechanisms configured as in FIG. 3B and FIG. 4B, any mentioned combination of embodiments may be used. Each actuator mechanisms 1110A, 1110B and 1110C may operate in cooperation or independent from that of another actuator mechanism and may be positioned such that the heads carried by actuator mechanisms 1110A and 1110B communicate with the same disk 102J in disk stack 1102 or, in an alternative arrangement, at least one head carried by actuator mechanism 1110C may be in communication with different disks, for example disk 102D and disk 102E. By way of example, at least one head carried by actuator mechanism 1110A may be configured to read disk 102J, at least one head carried by actuator mechanism 1110B may be configured to write to disk 102 and at least one head carried by actuator mechanism 1110C may be configured to both read and write to disk 102C.

Figure 12A:
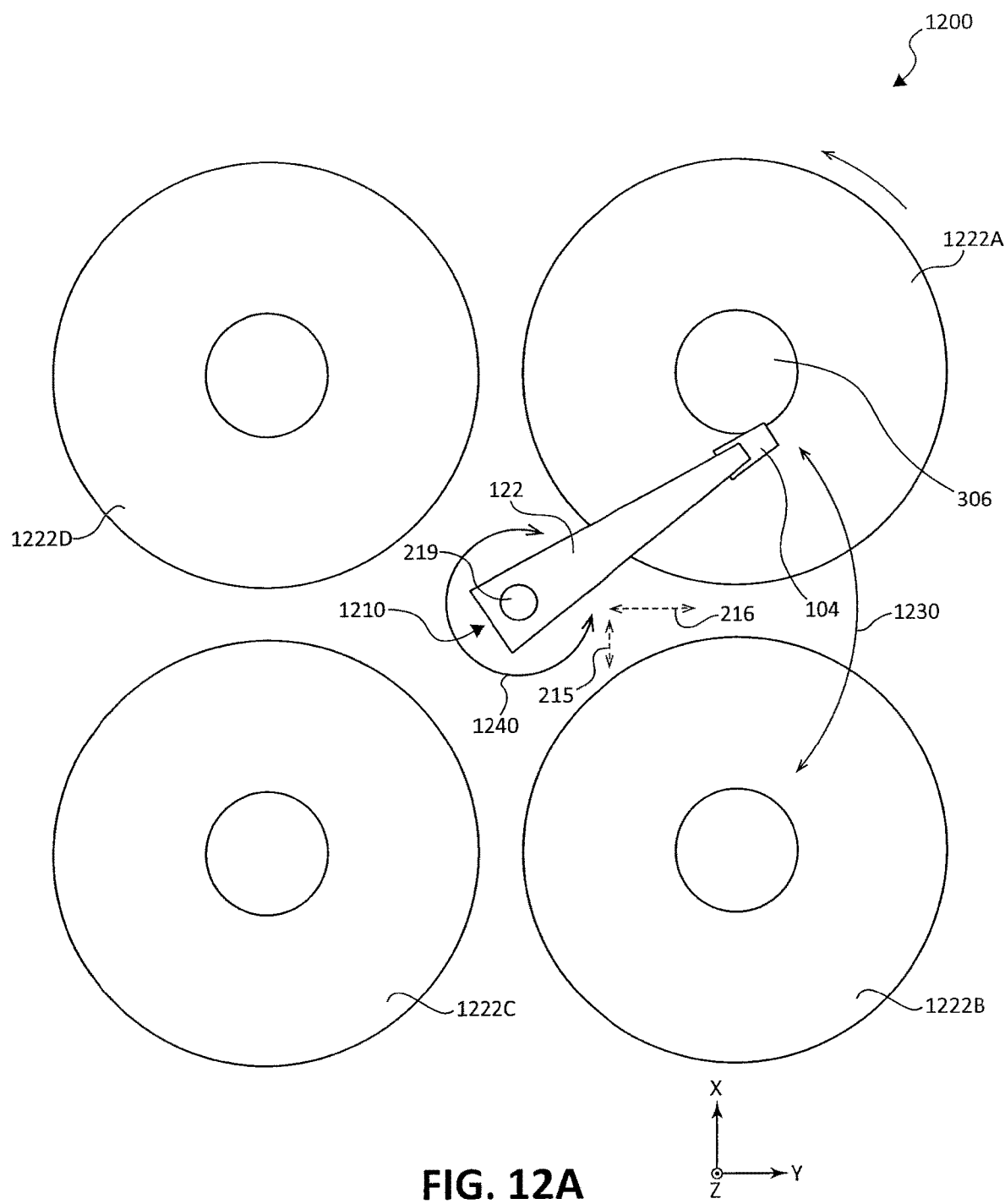
FIGS. 12A and 12B are schematic illustrations of a data storage device according to an embodiment of the disclosure.
Figure 12B:
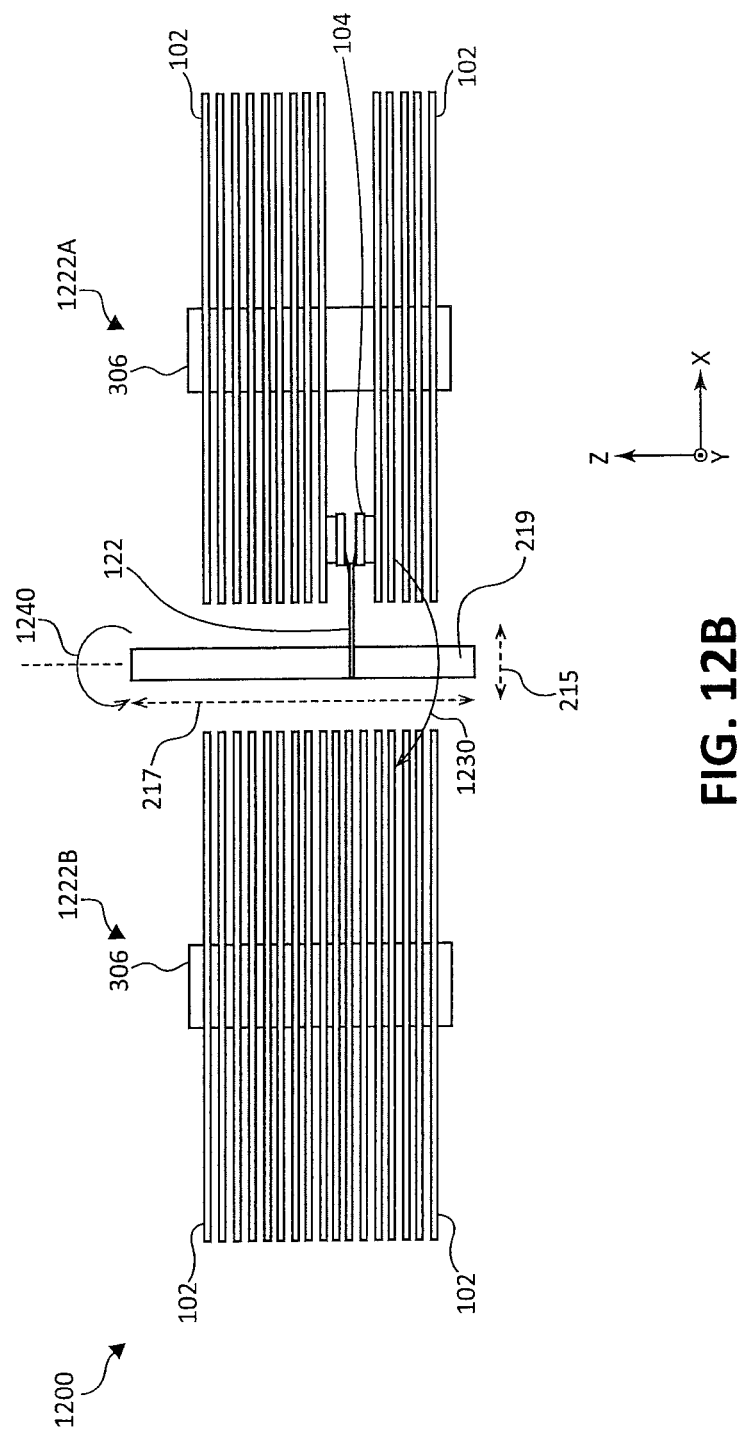

FIGS. 12A and 12B illustrate an embodiment of a storage device 1200 having a plurality of disk stacks 1222A, 1222B, 1222C and 1222D. FIG. 12A shows a first disk stack 1222A, a second disk stack 1222B, a third disk stack 1222C and a fourth disk stack 1222D. Although four disk stacks are shown, there may be more or less disk stacks. Each disk stack 1222 may have an arrangement similar to any of the other discussed embodiments. An actuator mechanism 1210 is configured with at least one actuator arm 122, each actuator arm 122 having at least one head 104. The at least one actuator arm 122 is configured to rotate about the Z axis such that the at least one head 104 rotates 1230 from one disk stack to a different disk stack. The actuator arms 122 are configured to be at least 360 degrees rotatable. Further, as discussed with the embodiment shown in FIG. 3, actuator mechanism 1210 is configured to translate in the x-direction 215 along the x-axis, y-direction 216 along the y-axis and z-direction 217 along the z-axis in order to provide precise head 104 placement on disk 102. By way of non-limiting example, the at least one head 104 may rotate 1230 from first disk stack 1222A to second disk stack 1222B. Actuator arm 122 may rotate from disk stack 1222A to disk stack 1222B, along with translating along the Z axis in the z-direction 217 of the actuator mechanism 1210 to a specified disk 102 in disk stack 1222B. As shown in FIG. 12B, the at least one head 104 of arm 122 is arranged between two disks of disk stack 1222A. Arm 122 is configured to rotate 1230 to disk stack 1222B where the disks in the disk stack 1222B are translated up or down until there is a gap between the desired disks. The arm 122 is translated along the z-direction 217 along the z-axis until it reaches the desired height. The arm 122 is then rotated 1230 to a different disk stack, e.g., disk stack 1222B-D. The disks 102 in disk stack 1222A either remain in the position they were left in to conserve energy, or the disks are translated such that there is no gap between them in order to conserve space.

Figure 13:
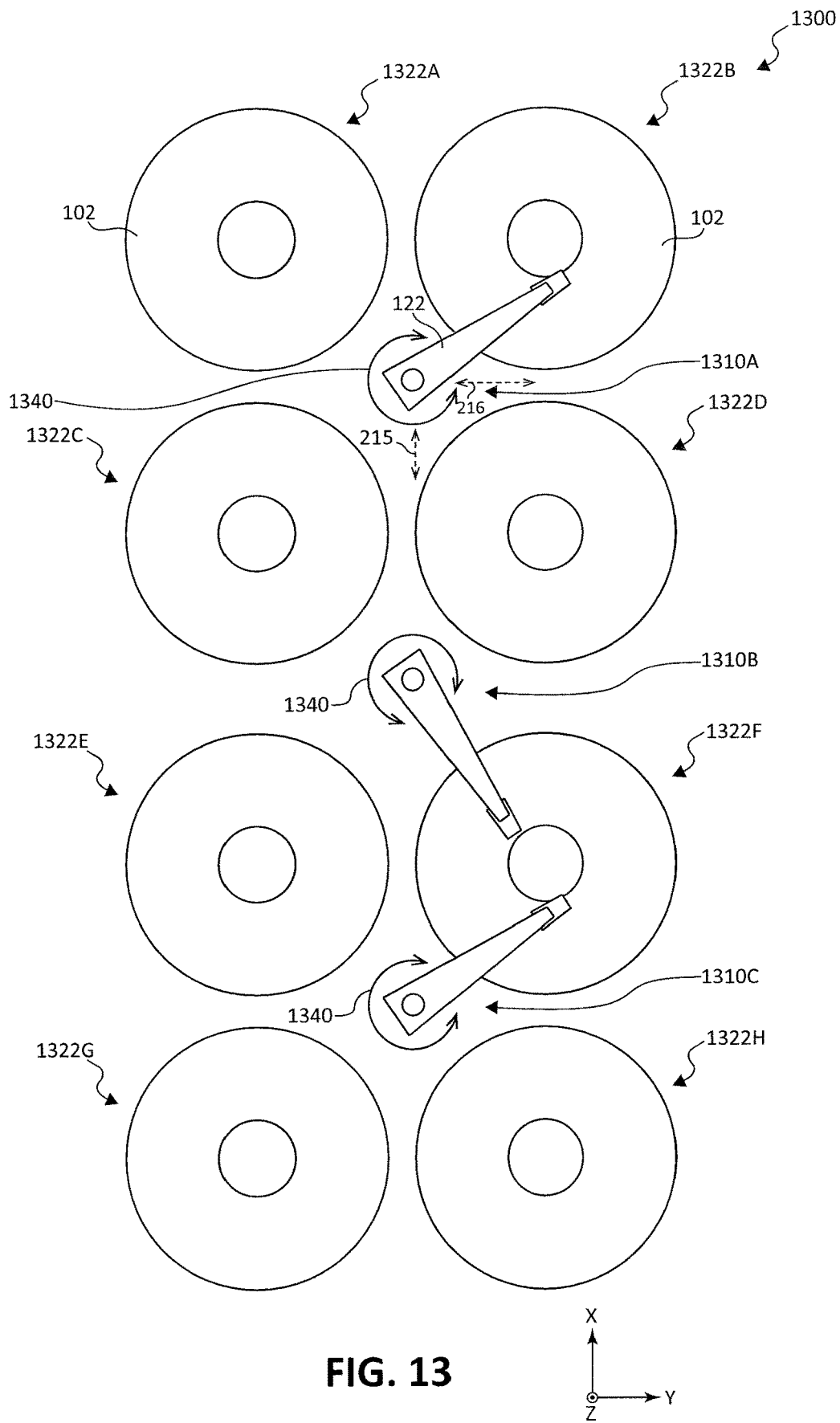
FIG. 13 is a schematic illustration of a data storage device according to an embodiment of the disclosure.

FIG. 13 illustrates an embodiment of a storage device 1300 comprising a plurality of disk stacks 1322 and a plurality of actuator mechanisms 1310. Storage device 13000 includes disk stacks 1322A-1322H with actuator mechanism 1310A-1310C. There may be more or less disk stacks 1322 and there may be more or less actuator mechanisms. Further, although a 4×2 arrangement of disk stacks is illustrated, other dimensions may also be used. Actuator arm 122 of actuator mechanism 1310A may rotate 1340, either clock-wise or counterclockwise, about the Z axis to disk stack 1322A, 1322B, 1322C or 1322D. Likewise, actuator arm 122 of actuator mechanism 1310B may rotate 1340 about the Z axis to disk stack 1322C, 1322D, 1322E or 1322F. Actuator arm 122 of actuator mechanism 1310C may rotate 1340 about the Z axis to disk stack 1322E, 1322F, 1322G or 1322H. Further, each of the actuator mechanisms 1310A-1310C may be configured to translate in the x-direction 215 and/or the y-direction 216. The actuator mechanism may be configured similar to any of the described embodiments. Further, as with the actuator mechanism described in the embodiment shown in FIG. 12B, each actuator arm 122 may translate along the Z axis in the z-direction 217 of the actuator mechanism 1312 to a specified disk 102 in disk stack 1322.

Figure 14A:
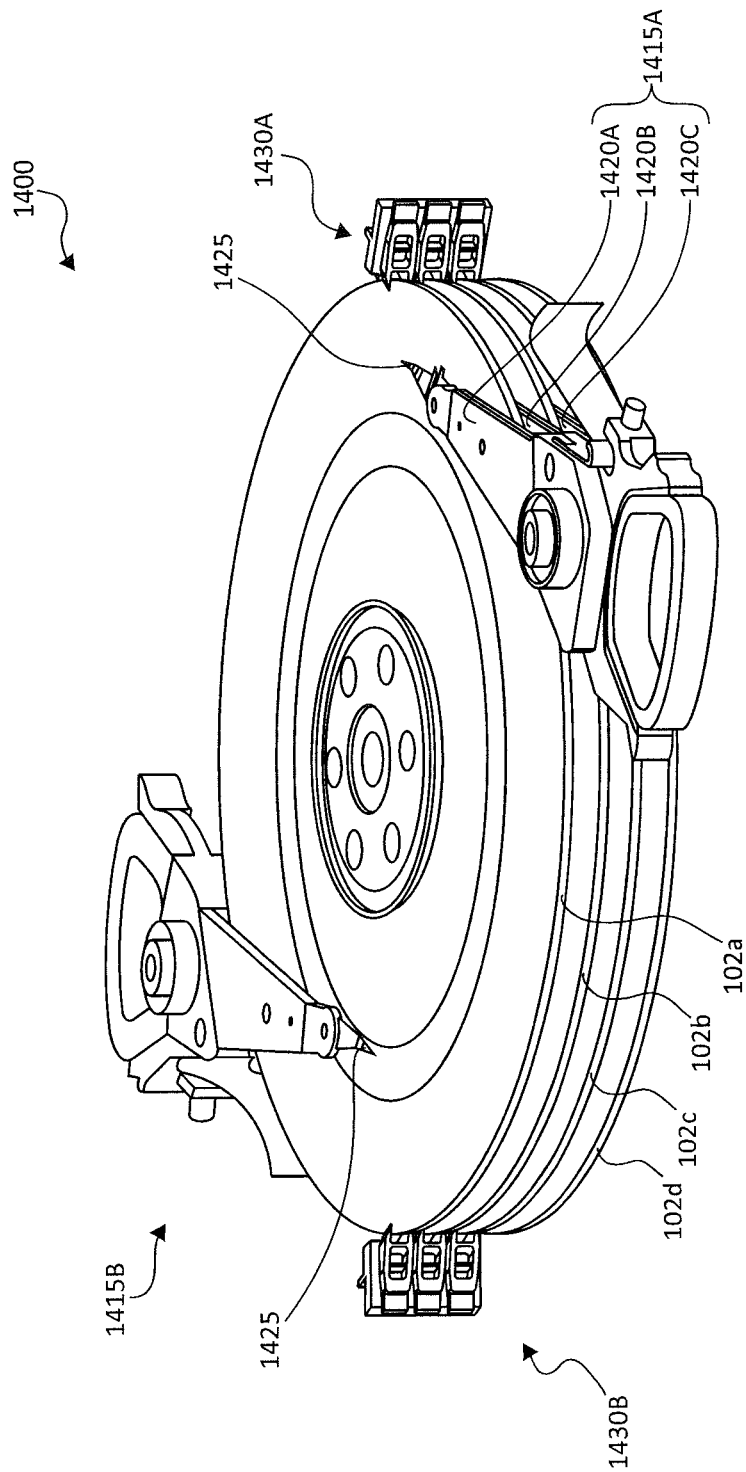
FIGS. 14A and 14B are schematic illustrations of a data storage device according to an embodiment of the disclosure.
Figure 14B:
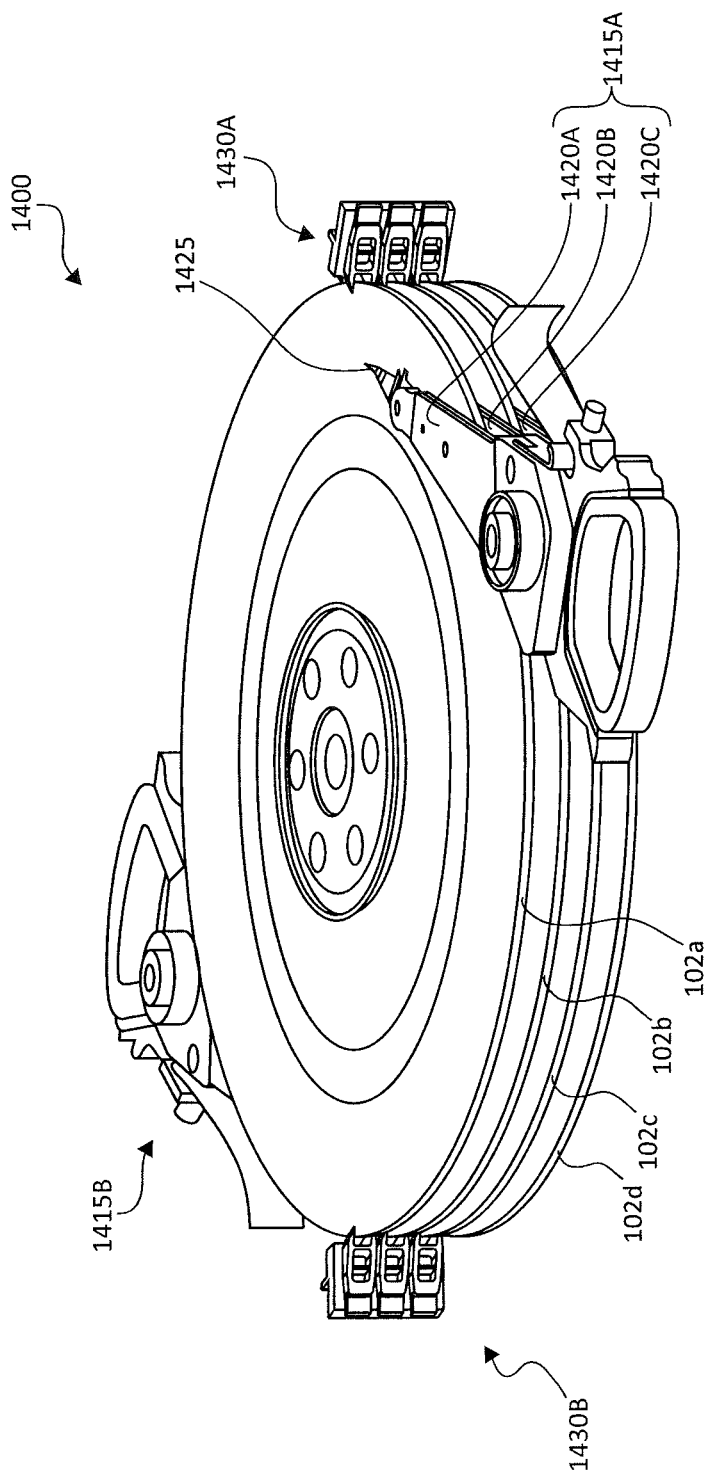

FIGS. 14A and 14B illustrates another embodiment of a storage device 1400. The storage device 1400 includes at least one arm stack 1415A, 1415B, each arm stack 1415A-B comprising a plurality of arms 1420A, 1420B, 1420C. Each of the plurality of arms 1420A-C includes a head 1425. The arm stack may comprise additional or fewer arms than illustrated in FIGS. 14A and 14B. Further, although two arm stacks 1415A-B are illustrated in FIGS. 14A and 14B, there may be more arm stacks or a single arm stack. Arm stacks 1415A-B provide a jointless connection between arms 1420A-C such that a movement performed by one arm is performed by all of the arms. Thus, arms 1420A-C rotate in unison and the arm stack 1415 are configured to move along the z-axis, positioning arms 1420A-C between a different set of disks. This embodiment allows the storage device 1400 to have a reduced number of heads 1425 and pre-amp channels than the case of an arm arrangement stationary in the sense that it does not move along the z-axis.

In an embodiment, the arms are arranged such that every other disk is arranged with a head 1425, the head 1425 may be arranged to read/write from the top of disk and/or the bottom of the disk. Thus, a disk may be arranged with one or two heads. In another embodiment, the number of arms is reduced such that there are only two heads, the uppermost head being arranged as a down head and the bottommost head being arranged as an up head, such that the uppermost head is arranged over the top surface of a disk 102 and the bottommost head is arranged over the bottom side of the same disk. This embodiment is advantageous as it allows the disks to remain in the same position along the z-axis, while still reducing the number of arms in the disk storage drive.

In addition to the arm stacks 1415A-B, an embodiment of storage device 1400 further includes at least one ramp 1430A-B, where the number of ramps corresponds to the number of heads in the storage device 1400, such that each head has a resting place on the at least one ramp. An elevator mechanism enables arm stack 1415A-B and ramp 1430A-B to move, in some embodiments the arm stack 1415A-B and the corresponding ramp 1430 A-B move in unison. A particular embodiment of the elevator mechanism is described in further detail below in connection with FIG. 16. When the arm stack 1415A-B is to be repositioned to a different location from the current location in order to access a different disk, the elevator mechanism moves the corresponding ramp 1430A-B. In an embodiment, the ramp 1430 and the arm stack 1415 are connected to the same actuator or elevator mechanism enabling the arm stack 1415A-B and the ramp 1430A-B to move together.

Figure 15A:
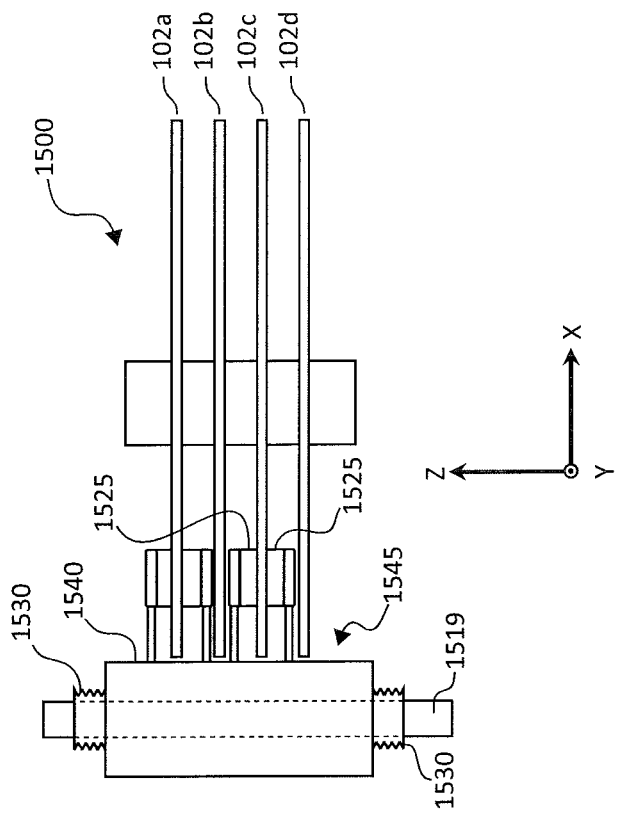
FIGS. 15A and 15B are illustrations of a data storage device according to an embodiment of the disclosure.
Figure 15B:
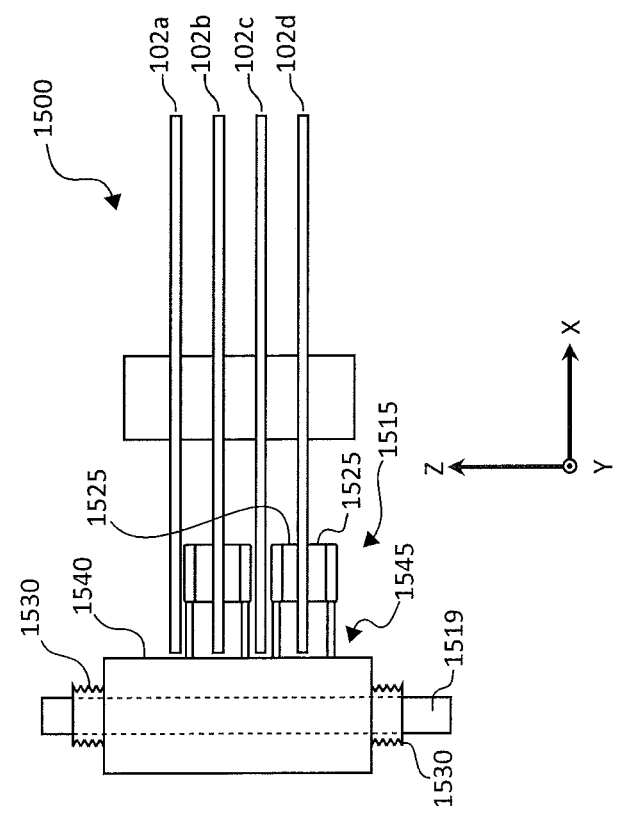

In an alternative embodiment of a storage device 1500 illustrated in FIGS. 15A and 15B, a two-stop elevator system comprises at least four heads 1525 and four preamp channels. The heads 1525 are moved in unison such that they initially access two disks (e.g., disk 102b and disk 102d shown in FIG. 15A), and when they move, the heads access disks 102a and 102c shown in FIG. 15B.

In an alternative arrangement, the arms may be arranged such that the heads 1525 access the bottom or the top half of, for example, a four-disk stack. By way of example, the arms in arm stack 1515 are arranged to access disks 102d and 102c and are then moved in unison to access disks 102b and 102a. The arm stack 1515 is also movable in the opposite direction back to disk 102c and 102d. As discussed above, the embodiment illustrated in FIGS. 15A and 15B may also include a moveable ramp 1430 which follows the movement of the heads 1525 such that the movable ramp 1430 moves in unison with the heads 1525.

Alternatively, storage device 1500 may be configured with a multi-stop elevator. As an alternative to the embodiment shown in FIGS. 15A and 15B, storage device 1500 may include two heads 1525 of the four heads illustrated with two preamp channels, where the heads 1525 access a single disk. The heads may be moved from disk to disk. By way of example, the heads may be moved from disk 102d to disk 102a, or from disk 102d to disk 102c. The reduction of the number of heads and preamp channels allows for a reduction in cost.

In the different embodiments described above, moveable pieces within storage devices may be enclosed in membranes or bellows in order to prevent contaminates or particles from reaching the disks/heads. In the particular embodiment shown in FIGS. 15A and 15B, an example of bellows 1530 is illustrated. In this embodiment, an E-block 1545 moves along and about a stationary shaft 1519. E-block 1545 includes arm stack 1515. Linear or rotary movement along or about shaft 1519 may create friction. To prevent contaminates or particles, which may be emitted from the movement of E-block 1545 along shaft 1519, from entering the disk/head space, bellows 1530 are arranged around shaft 1519 at each end of E-block 1545 and in connection with E-block 1545. Bellows 1530 are flexible and able to expand and contract as arm stack 1515 and E-block 1545 move up and down along shaft 1519. Thus, as E-block 1545 moves, particles are contained between E-block 1545 and shaft 1519 by bellows 1530.

Figure 16:
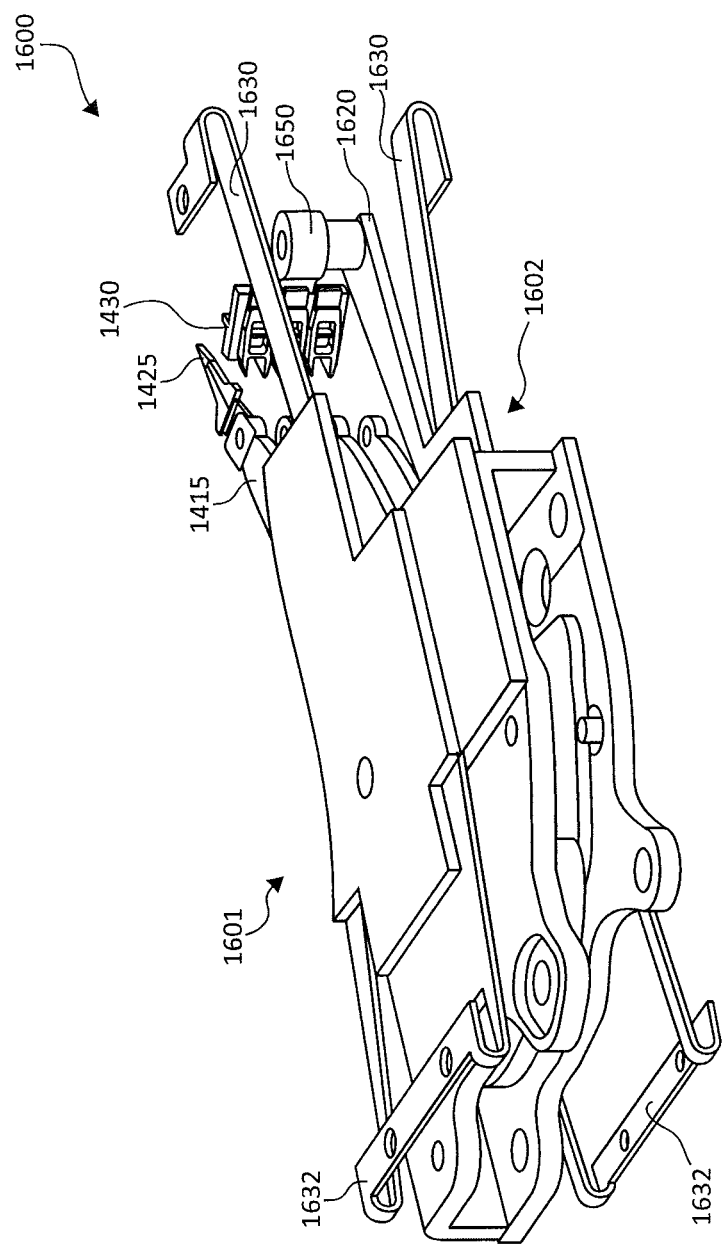
FIG. 16 is an illustration of an elevator for a data storage device according to an embodiment of the disclosure.

FIG. 16 illustrates an embodiment of an elevator 1600 for the moveable ramp and the arms, allowing them to move in unison. Elevator 1600 comprises an upper portion 1601 and a lower portion 1602. Each portion having a flexible first end 1630 and a flexible second end 1632. The arm stack 1415 and moveable ramp 1430 are positioned between the upper portion 1601 and the lower portion 1602 and are connected together via a base 1620, thus when the arm stack 1415 moves, the moveable ramp moves also. The elevator may be driven up and down by a coil and a magnet (not shown) with hard stops at both ends. Thus, when driven up, the arm stack 1415 and the moveable ramp 1430 are stopped by an upper limit of the system. In the embodiment illustrated in FIG. 16, the upper limit comprises a stopper 1650 arranged with the moveable ramp 1430. The flexible first end 1630 of the upper portion 1601 reaches the stopper 1650 of the moveable ramp and halts the upward movement. In the downward movement, the movement may be stopped by the base 1420 reaching the flexible first end 1630 of the lower portion 1602 which halts the progression of the downward movement. This arrangement may be advantageously pre-assembled before being placed into a form factor for a disk drive and further allows for a gain in areal density and/or an improved throughput performance. Further, this arrangement reduces the number of moving parts in a disk drive.

Some detail regarding the uses of magnetic film coated foils instead of data storage discs was provided above in connection with FIGS. 6A and 6B. Additional detail regarding the use of magnetic film coated foils is data storage devices is provided below in connection with FIGS. 17A-19B.

In the description provided above in connection with FIGS. 6A and 6B, data storage devices employ magnetic film coated foils (in general, data storage foils), which are thinner than a data storage disk. In different embodiments, such foils may be employed in HDDs, hybrid drives and other such data storage devices to increase volumetric density.

In some embodiments, a data storage foil may include a single monolithic material (e.g., aluminum, tin, or even a polymer) layer with different thin film magnetic layers formed on opposing surfaces (or on one surface) of the single monolithic material layer. A suitable protective coating may be applied over each of the magnetic layer(s). In other embodiments, a data storage foil may include a substrate with multiple layers (e.g., a polymer coating, a structural polymer layer, and a soft metal layer) with magnetic thin films and associated coatings on the multi-layered substrate. In different embodiments, the magnetic layers may be formed on the substrate by sputtering, chemical vapor deposition (CVD) or any other suitable coating techniques. The process of data storage foil manufacture may include initially forming all the layers as a relatively large sheet, and then cutting out individual data storage foils from the sheet. In general, each data storage foil may have a non-zero thickness that is less than or equal to 1 millimeter. In some embodiments, each data storage foil may have a thickness in a range of 4 micrometers to 1 millimeter.

In some embodiments, each data storage foil may have in-built support provided at the ID and/or OD. For example, regions of the data storage foil near or at the ID and/or OD may include an additional adhesive bonded layer of a stiffer material or a similar material. In another example, ribbed structures may be included near or at the ID and/or OD of the data storage foil. The inclusion of the ribbed features may not prevent the data storage foils from being stacked one above the other. If volumetric density is not a substantial concern, the ribbed features could also have shapes such a 3-dimensional waves for the purpose of distinguishing the data storage foils from one another, as well as for keeping them separate.

In different embodiments (e.g., HDD and hybrid drive embodiments), to enable data storage foils (which are rotatably mounted on a spindle) to be structurally sound while spinning, a suitable support system for the data storage foils may be employed. In some embodiments, an entire surface of the data storage foil may be supported. In other embodiments, the data storage foils may be supported at or near the OD. In embodiments that provide full support, the support may be single-sided, and a Bernoulli effect or suction system may be employed to provide the support. The support may be porous to allow distribution of the vacuum. In some embodiments, the support(s) may be retractable. In some embodiments, the supports may have air blade or air bearing features to enable maintenance of a suitable head-foil spacing. In certain embodiments, the support may include a cover that slides over the data storage foil. Examples of data storage devices (e.g., HDDs) in which different mechanisms are used to support a data storage foil during read/write operations are provided below in connection with FIGS. 17A-19B.

Unlike the above-described rotary actuator mechanisms (e.g., actuator mechanism 210 that rotates arm 122 of FIG. 6A), linear actuator assemblies are employed in the embodiments of FIGS. 17A-19B. Such linear actuator assemblies allow for zero skew (or fixed skew) when read/write operations to data storage media (e.g., foil) tracks are carried out.

Figure 17B:
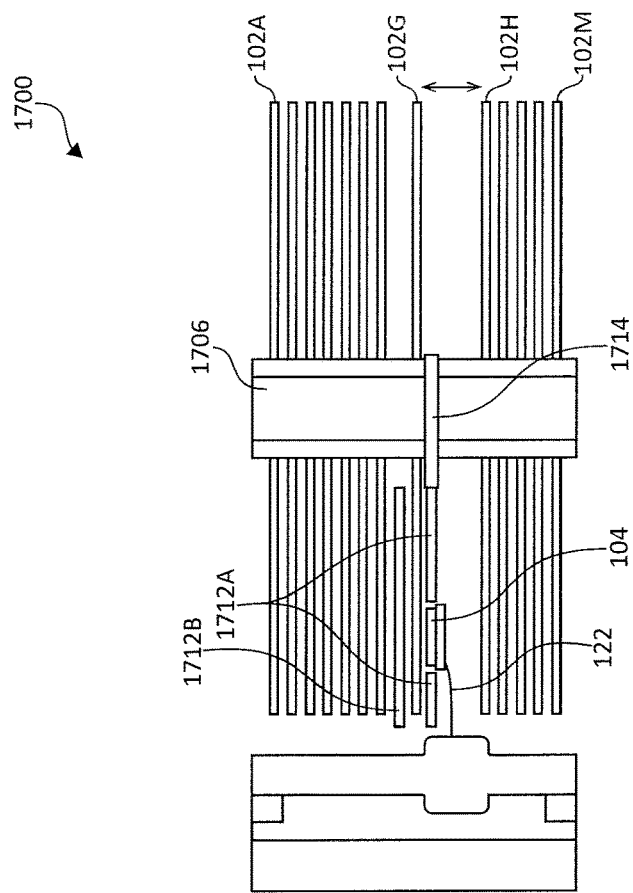
FIGS. 17A and 17B are top and side schematic views, respectively, of a data storage device/system that includes data storage foils as its data storage media in accordance with one embodiment.
Figure 17A:
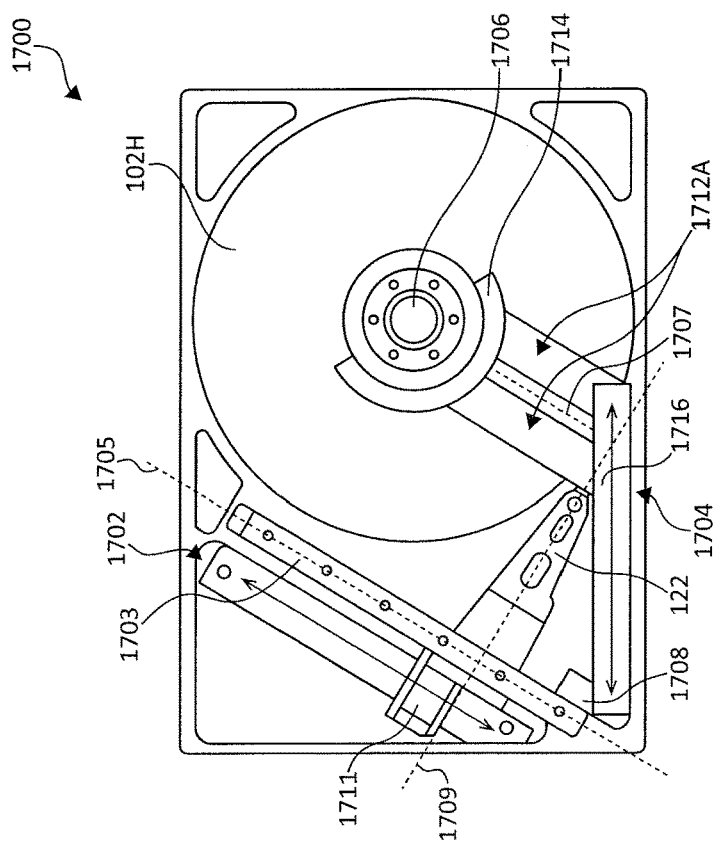

FIGS. 17A and 17B are top and side schematic views, respectively, of a data storage device/system 1700 that includes data storage foils as its data storage media in accordance with one embodiment. Data storage device 1700 includes a linear actuator assembly 1702 that may include one or more rails 1703 extending along a rail axis 1705 (or a parallel rail axis in the case of more than one rails 1703). In an exemplary embodiment, rail axis 1705 is parallel to a data storage foil radius 1707 on which head 104 travels. The rails 1703 may define any suitable cross-sectional shape, such as square, rectangular, circular, or oval, for example. Further, the rails 1703 may include or be formed of any suitable material, such as stainless steel, or titanium, for example.

Linear actuator assembly 1702 includes an actuator arm 122 extending along an arm axis 1709 that is normal to both the rail axis 1705 and the data storage foil radius 1707. The actuator arm 122 includes at head 104 for reading data from and/or writing data to data storage foils 102. In the embodiment of FIGS. 17A and 17B, bottom surfaces of data storage foils 102 include magnetic layers, and are capable of storing data. However, top surfaces of data storage foils 102 are not utilized for data storage.

In data storage device 1700, the actuator arm 122 is movably attached to the rail(s) 1703 such that motion in the x-y plane is restricted to sliding motion along the rail(s) 1703. In other words, the actuator arm 122 may be movably attached to the rails 1703 so that the actuator arm 122 moves linearly and, therefore, the head 104 also moves linearly relative to the data storage foil 102, along radial line 1707. In the position shown in FIG. 17B, head 104 may be moved linearly by a suitable linear motor 1711, for example, along radial line 1707 of data storage foil 102G.

To help head 104 to better-interact with any data storage foil (e.g., data storage foil 102G), that data storage foil may be supported by a suitable support structure. In the embodiment of FIGS. 17A and 17B, data storage device 1700 employs a linearly slidable foil support assembly 1704 to support the data storage foil (e.g., foil 102G) that is currently being accessed by the head 104. It should be noted that data storage foils above 102H are excluded from FIG. 17A. The example linearly slidable foil support assembly 1704 includes one or more air blade/bearing supports 1712 (e.g., lower and upper supports 1712A and 1712B, respectively, and clamp 1714). The air blade/bearing supports 1712 and clamp 1714 may be formed of any suitable material (e.g., metal, plastic, ceramic, etc.). When the clamp 1714 is in place around a portion of rotating spindle 1706 and the air bade/bearing supports 1712 are in close proximity to, for example, data storage foil 102G as shown in FIG. 17B, the relative motion between the spinning data storage foil 102G and the air blade/bearing supports 1712 provides an ultra-thin air bearing film between the supports 1712 and the data storage foil 102G. The film is also present between the clamp 1714 and the data storage foil 102G. The presence of the ultra-thin air bearing film helps maintain head 104-foil 102G spacing, and helps straighten and/or stiffen the data storage foil 102G, thereby improving the ability of the head 104 to properly interact with the data storage foil 102G. An end of the air blade/bearing supports 1712, which is opposite to the clamp end or the air blade/bearing supports 1712, is coupled to, for example, a rail 1716. This enables the air blade/bearing supports 1712 and the clamp 1714 to be retracted away from the data storage foil stack 102, which, in turn, allows the air blade/bearing supports 1712 and the clamp 1714 to also be moved in a z direction, so that different data storage foils 102 may be supported a different times.

To enable z-direction movement of actuator arm 122 and foil-support elements such as air blade/bearing supports 1712 and clamp 1714, one or more elevators 1708 are provided. In one embodiment, a single elevator 1708 may be coupled to both actuator arm 122 and air blade/bearing supports 1712 and may be configured to move both elements 122 and 1712 in unison in a z direction relative to data storage foils 102. An example showing components that may be utilized to provide linear movement and z-direction movement in a data storage device such as 1700 is provided further below in connection with FIGS. 20A-20D.

It should be noted that different data storage foils 102 may be differentiated from one another by including data storage medium identification features such as 915 (of FIG. 9A) and/or 1015 (of FIG. 10B), and corresponding access mechanisms such as 925 (of FIG. 9B) and/or 1015 (of FIG. 10B) may be used to identify the different features. Elements 915, 1015, 925 and 1025 are described in detail above in connection with FIGS. 9A-10B. Further, coarse and fine positioning of elevator 1708 may be carried out using any suitable technique. Details regarding coarse and fine positioning of elevators are provided in commonly owned U.S. patent application Ser. No. 17/010,289 for "Actuators for an Elevator Drive," filed Sep. 2, 2020, which is herein incorporated by reference.

In data storage device 1700 of FIGS. 17A and 17B, head 104 interacts with bottom surfaces of data storage foils 102, and not with top surfaces of those foils. However, in some embodiments, both bottom and top surfaces of data storage foils 102 may include magnetic storage surfaces, and head 104 may interact with both the top and bottom surfaces of each data storage foil 102. Such embodiments are shown in FIGS. 18A-19B, and briefly described below.

Figures 18A, 18B:
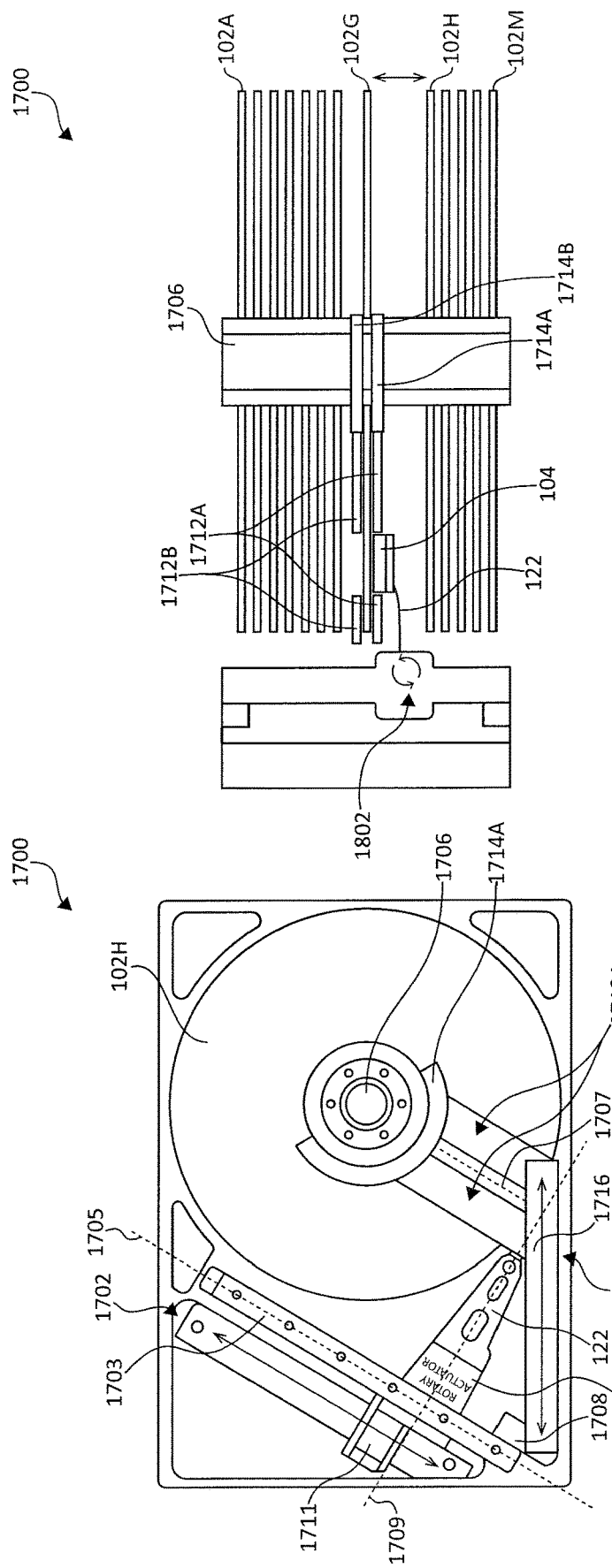
FIGS. 18A and 18B are top and side schematic views, respectively, of a data storage device/system that includes data storage foils whose opposing surfaces are used for data storage/retrieval by a same head in accordance with one embodiment.

FIGS. 18A and 18B are top and side schematic views, respectively, of a data storage device/system 1800 that includes data storage foils whose opposing surfaces are used for data storage/retrieval by a same head in accordance with one embodiment. In the interest of brevity, descriptions of elements that are common to data storage device 1700 (of FIGS. 17A and 1B) are not repeated in connection with data storage device 1800. A primary additional element included in data storage device 1800 is a rotary actuator 1802 coupled to actuator arm 122. In some embodiments, rotary actuator 1802 may be a known piezoelectric rotary motor connected in a suitable manner and located, for example, between rail 1703 and actuator arm 122 as shown in FIG. 18A. In general, any suitable type of rotary actuator 1082 may be employed. The rotary actuator 1802 is configured to "flip" the actuator arm 122 such that head 104 may either face in an upward direction or in a downward direction. Thus, for example, head 104 may be positioned along radial line 1707 of the lower surface of data storage foil 102G for read/write operations. When those read/write operations are completed, for example, actuator arm 122 may be slid along rails 1703 such that the actuator arm 122 (along with head 104) is at a location away from the data storage foil stack 102 (e.g., the location of actuator arm 122 in FIG. 18A). In that location, the rotary actuator 1802 may flip the actuator arm 122, and the elevator 1708 may move the actuator arm 122 in an upward direction until head 104 is at a suitable z-axis location. At that location, the actuator arm 102 may be suitably moved along rails 1703 until the head 104 is at a desired location along radial line 1707 of the upper surface data storage foil 102G for read/write operations to be carried out. It should be noted that in such embodiments, instead of a single clamp 1714 (shown in FIGS. 17A and 17B) a lower clamp 1714A and an upper clamp 1714B may be employed for supporting the data storage foils 102. In other respects, data storage device 1800 is substantially similar to data storage device 1700 (of FIGS. 17A and 17B).

Figures 19A, 19B:
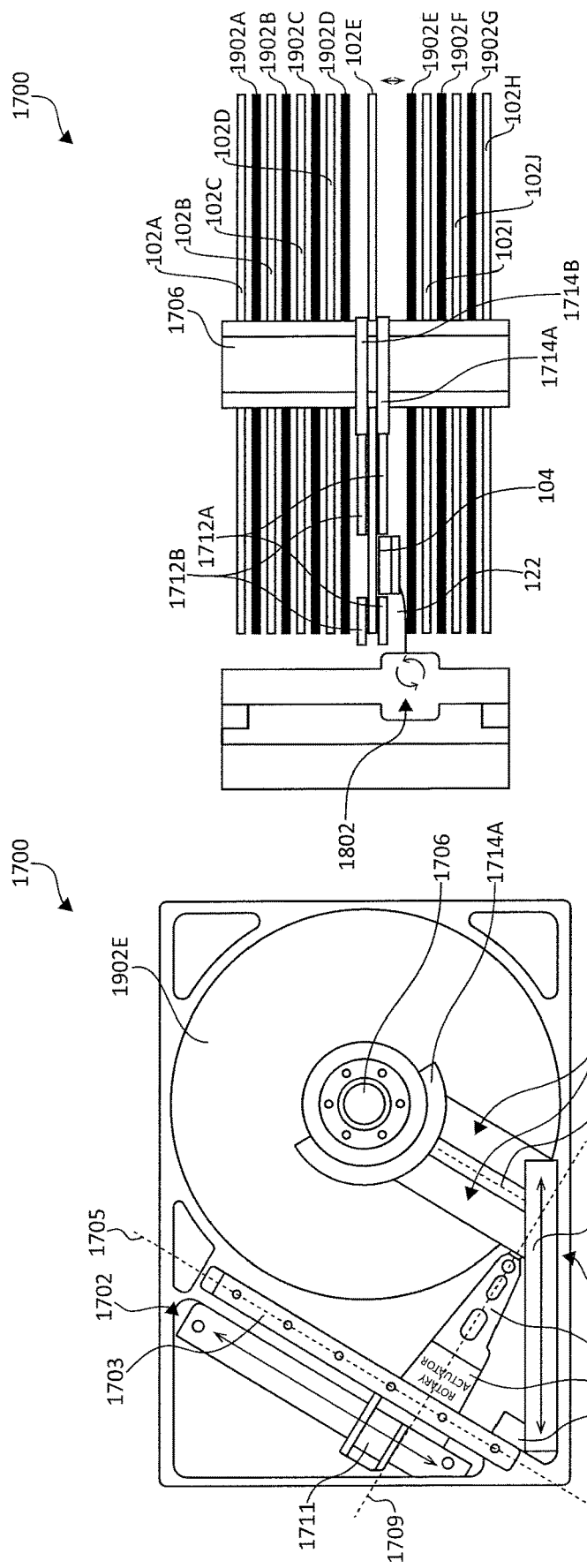
FIGS. 19A and 19B are top and side schematic views, respectively, of a data storage device/system that includes data storage foils and separator platters between the data storage foils in accordance with one embodiment.

FIGS. 19A and 19B are top and side schematic views, respectively, of a data storage device/system 1900 that includes data storage foils and separator platters between the data storage foils in accordance with one embodiment. In the interest of brevity, descriptions of elements that are common to data storage device 1700 (of FIGS. 17A and 1B) and 1800 (of FIGS. 18A and 18B) are not repeated in connection with data storage device 1900. Primary additional elements included in data storage device 1900 are separator platters 1902. Separator platters 1902 are not utilized for data storage, and therefore may not include and magnetic storage layers. Separator platters 1902 may be formed of any suitable material or combination of materials (e.g., glass, metal, plastic, etc.). Platters 1902 help separate the different data storage foils 102 from one another, and may aid in moving data storage foils 102 along spindle 1706. Any suitable identification features (such as those described above in connection with FIGS. 9A-10B) may be utilized to differently identify separator platters 1902 from data storage foils 102. Alternatively, an optical feedback system may be utilized for distinguishing separator platters 1902 from data storage foils 102 based on different reflection signals obtained in response to transmitted optical signals directed at the foils 102 and the platters 1902. In other respects, data storage device 1900 is substantially similar to data storage device 1800 (of FIGS. 18A and 18B).

FIGS. 20A-20D show a portion of a data storage device/system 2000 (e.g., similar to portions of data storage devices/systems 1700, 1800 and 1900) to illustrate linear movement in the x-y plane and z-axis movement with components suitable for providing such movement in data storage device 1700, 1800 and 1900. In the interest of simplification, linearly slidable foil support assembly 1704 is not shown in FIGS. 20A-20D. However, components for linear movement in the x-y plane and z-axis movement utilized for linear actuator assembly 1702 shown in FIGS. 20A-20D, and described below, are also suitable for providing similar movement of the linearly slidable foil support assembly 1704.

Figure 20A:
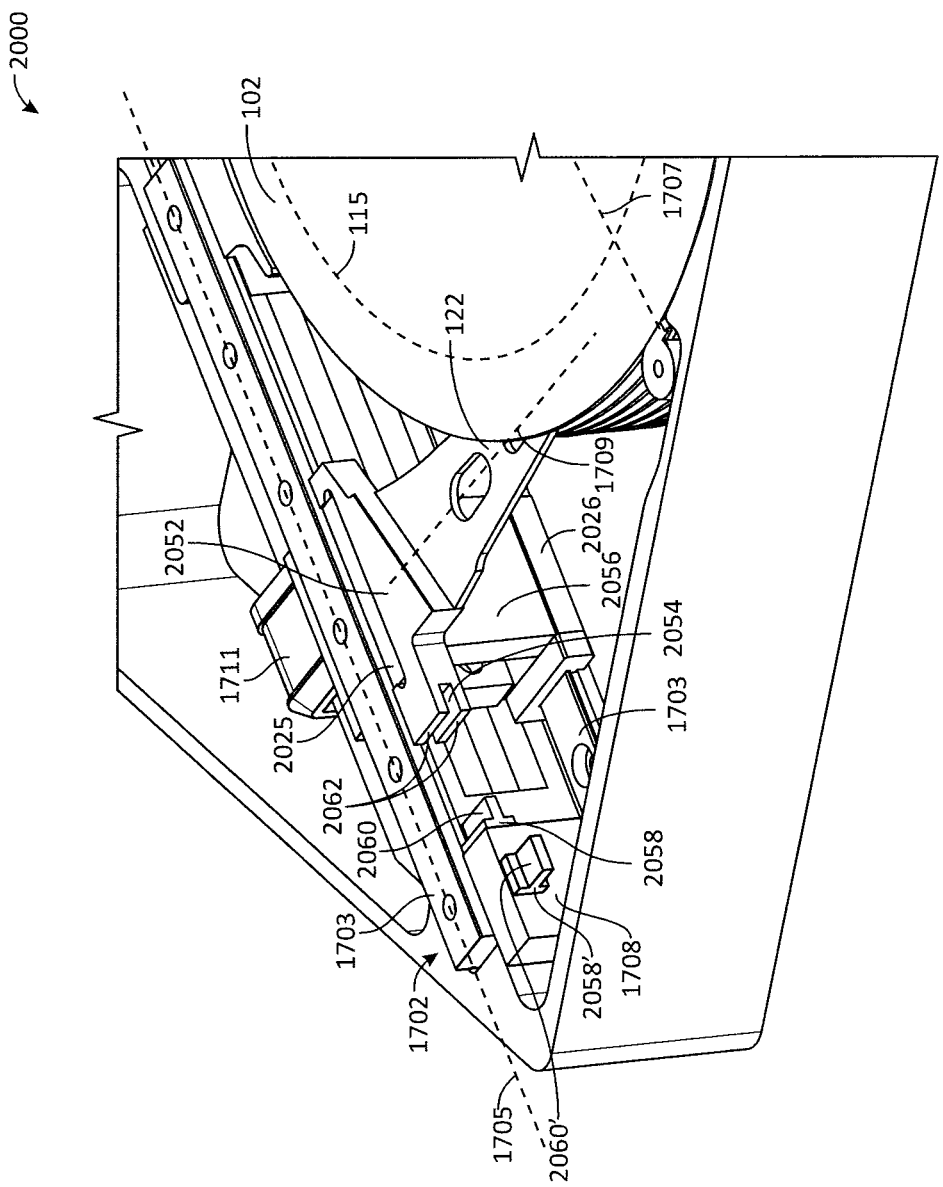
FIG. 20A is a perspective view of a data storage device including a zero skew elevator system, wherein the actuator arm is in a raised position below the disc.
Figure 20B:
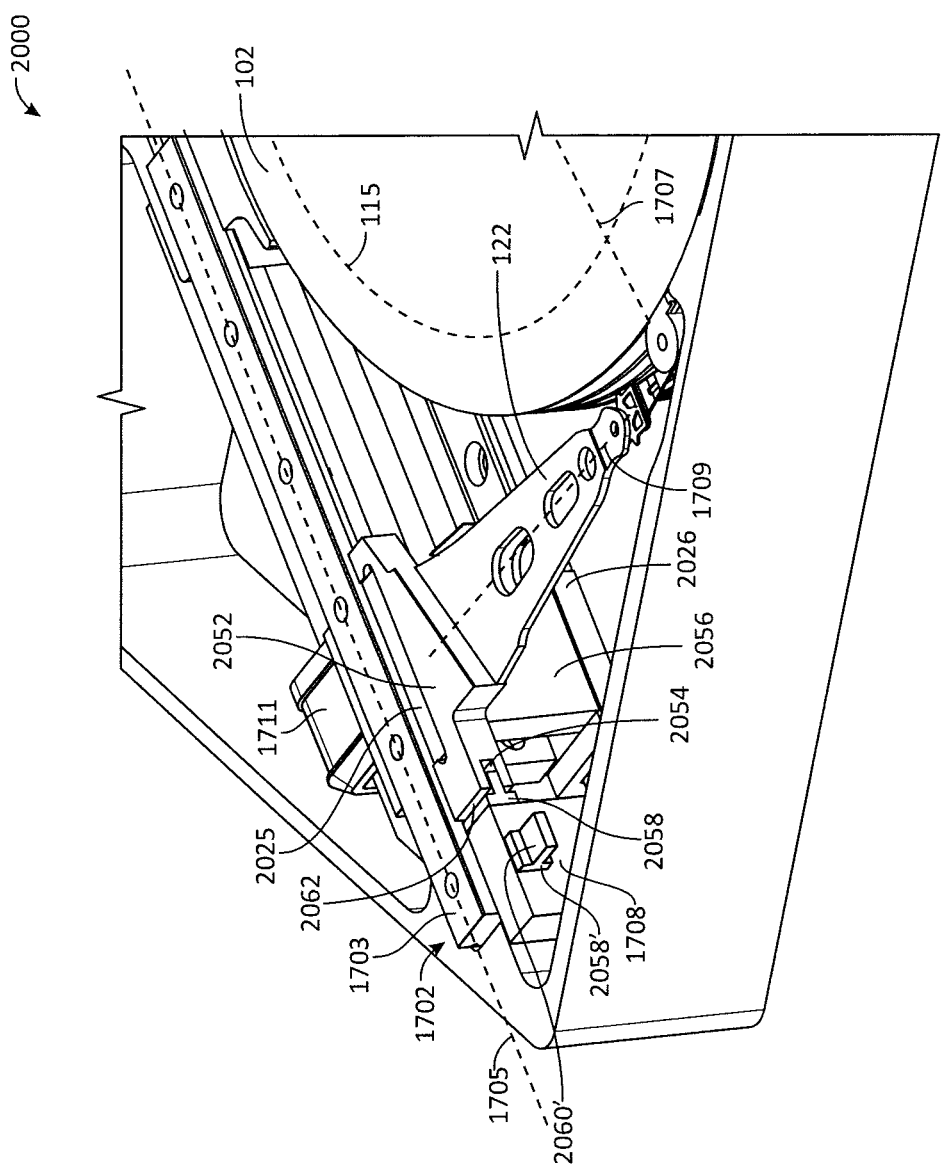
FIG. 20B is a perspective view of the data storage device including a zero skew elevator system, wherein the actuator arm is in a raised position off the disc.

FIG. 20A shows data storage device 2000 wherein the actuator arm 122 is in a raised position, and wherein it has slid linearly along rails 1703 to a position that the head 104 under data storage foil 102. FIG. 20B shows the actuator arm 122 in a raised position, wherein the head 104 is off the data storage foil 102. A vertical guide 2056 extends between a top sliding bracket 2025 and a bottom sliding bracket 2026 of linear actuator assembly 1702. A coupler bracket 2052 connects actuator arm 122 to the vertical guide 2056 in a manner that allows the coupler bracket 2052, and in turn the actuator arm 122, to move up and down the vertical guide 2056 in the z direction. Coupler bracket 2052 is selectively engageable with elevator 1708. In the illustrated embodiment, coupler bracket 2052 includes a cleft or recess 2054 between flanges 2062. An elevator bracket 2058, which moves up and down by motive of elevator 1708, has a complementary projection 2060. As shown in FIG. 20B, coupler bracket 2052 engages with elevator bracket 2058 by insertion of projection 2060 into recess 2054. While a particular bracket configuration is illustrated and described, it is contemplated that other coupling mechanisms such as clamps can also be used. The selective coupling and uncoupling of elevator 1708 and arm 122 is also referred to as "clamping," though no forceful frictional engagement may be involved.

Figure 20C:
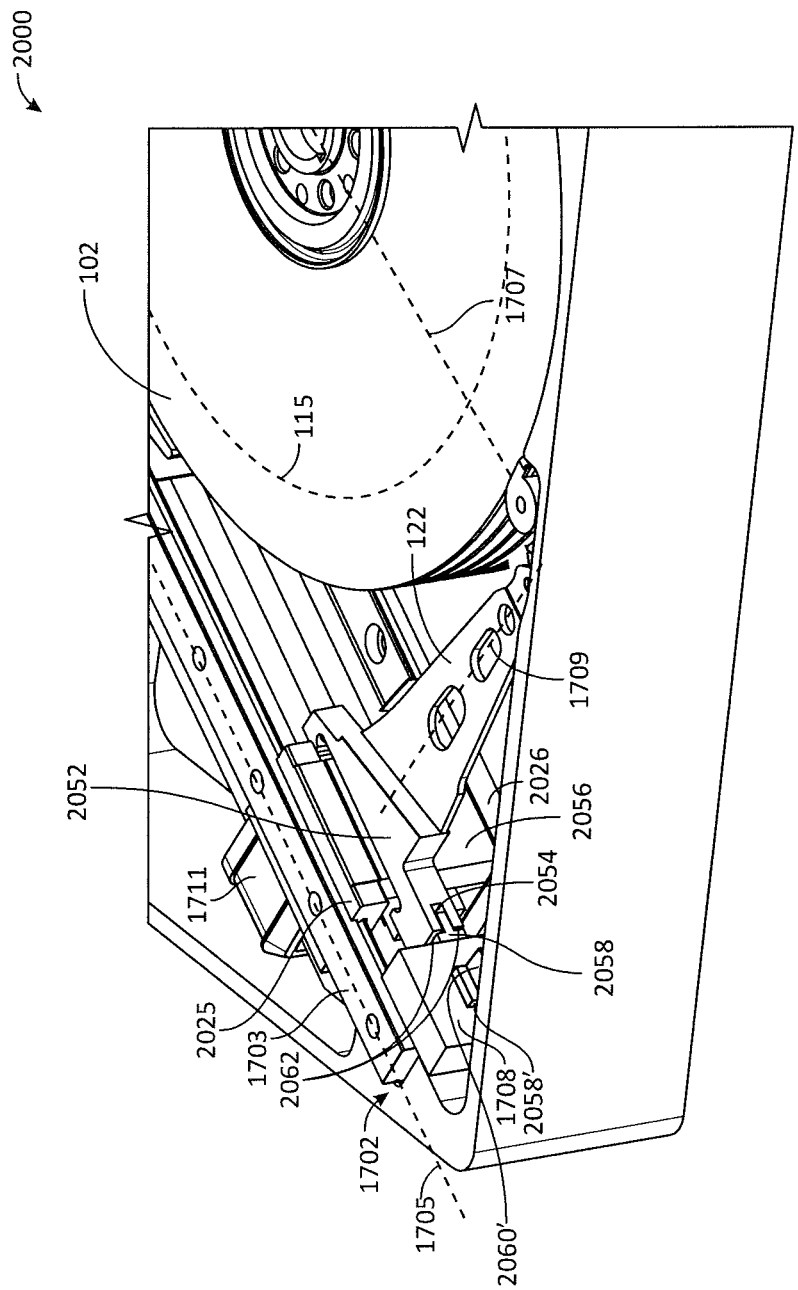
FIG. 20C is a perspective view of the data storage device including a zero skew elevator system, wherein the actuator arm is in a lowered position off the disc.
Figure 20D:
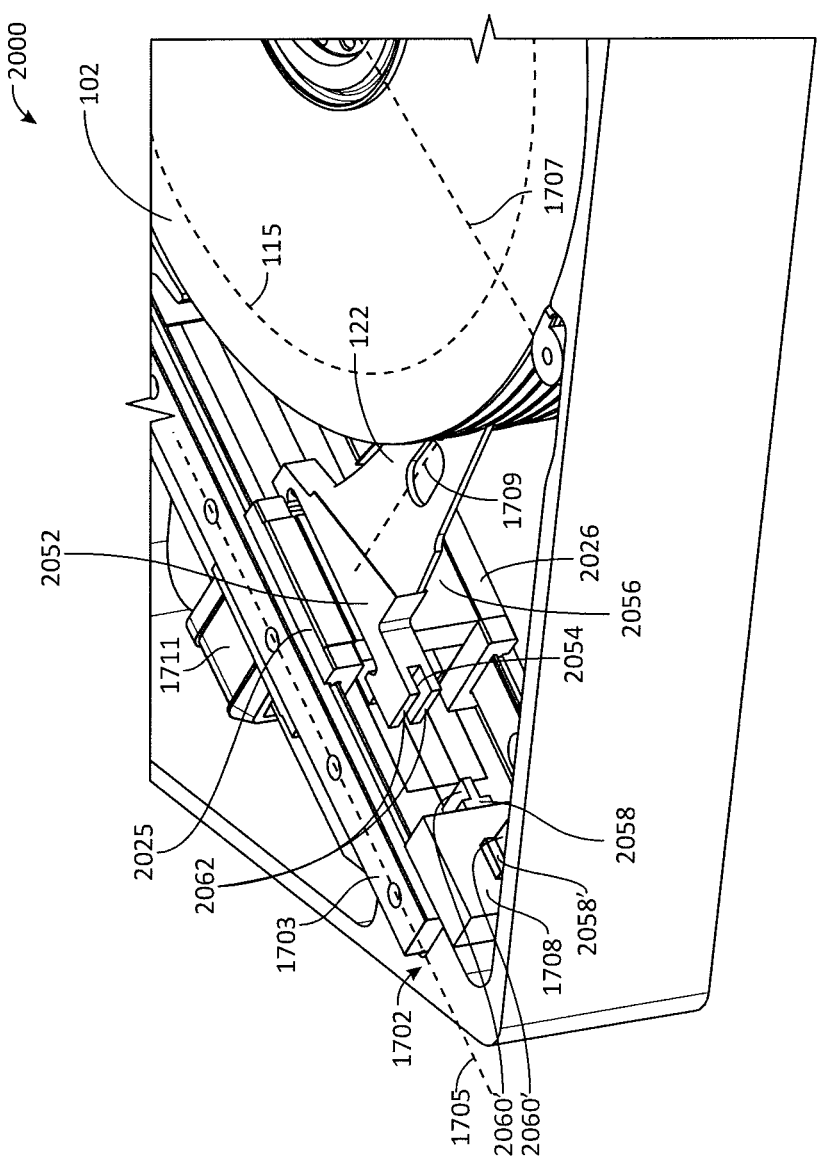
FIG. 20D is a perspective view of the data storage device including a zero skew elevator system, wherein the actuator arm is in a lowered position below the disc.

As shown in FIG. 20C, with the brackets 2052, 2058 thus physically connected, activation of elevator 1708 to lower or raise elevator bracket 2058 also lowers or raises the coupled bracket 2052 and the attached actuator arm 122. Thus, the actuator arm and head 104 can be moved up and down in the z direction to access different data storage foils 102 in the data storage foil stack using an elevator 1708 that is selectively connected to the actuator arm 122 to affect the vertical motion of the arm 122. When the actuator arm 122 has reached the desired vertical position, any type of braking mechanism can be used to hold the coupler bracket 2052 in the desired vertical position on vertical guide 2056. Then, linear motor 1711 is activated, as shown in FIG. 20D, to move the brackets 2025, 2026 and vertical guide 2056 along rails 1703. This x-y motion thereby disengages the recess 2054 from projection 2060 and allows the actuator arm 122 to slide between lower data storage foils in the stack to allow the head 104 to read/write a desired track. While particular coupling mechanisms are described for selectively engaging and disengaging actuator arm 122 to and from elevator 1708, it is to be understood that other mechanical, magnetic, electromagnetic, and other forms of physical connection and disconnection can be used.

As noted above in the description of FIGS. 17A and 17B, linear actuator assembly 1702 allows for zero skew (or fixed skew) throughout the entire stroke of the actuator arm 122. As in data storage device 1700 of FIGS. 17A and 17B, linear actuator assembly 1702 of the data storage device 2000 may include one or more rails 1703 extending along a rail axis 1705 (or a parallel rail axis in the case of more than one rail 1703). In an exemplary embodiment, rail axis 1705 is parallel to radial line 1707 of data storage foil 102 on which the head 104 travels. The rails 1703 may define any suitable cross-sectional shape, such as square, rectangular, circular, or oval, for example. Further, the rails 1703 may include or be formed of any suitable material, such as stainless steel, or titanium, for example.

Linear actuator assembly 1702 includes the actuator arm 122 extending along arm axis 1709 that is normal to both the rail axis 1705 and the data storage foil radial line 1707. As noted above, the actuator arm 122 includes at least one head 104 for reading and writing data from and to the data storage foil 102. The actuator arm 122 is movably attached to the rails 1703 such that motion in the x-y plane is restricted to sliding motion along the rails 1703. In other words, the actuator arm 122 may be movably attached to the rails 1703 so that the actuator arm 122 moves linearly and, therefore, the at least one head 104 also moves linearly relative to the data storage foil 104, along radial line 1707.

As illustrated, top sliding bracket 2025 is movably attached to the top rail 1703 and a bottom sliding bracket 2026 is movably attached to the bottom rail 1703. However, in one or more embodiments, the data storage device 2000 may include any number of rails and sliding brackets movably attaching the vertical guide 2056 to the rails 1703.

Exemplary drivers for Z direction motion of elevator 1708 include a ball screw with an internal motor, a voice coil motor, an inchworm style brake crawler, a linear motor, a shape memory alloy based actuator, and a combination of the above. By restricting motion of the actuator arm 122 to x-y plane movement only parallel to rail axis 1705, and by restricting motion of the actuator arm 122 to z plane movement normal to the x-y motion, this arrangement stabilizes the actuator arm 122 even while allowing it to reach any desired position on the recording media. In other words, the actuator arm 122 is prevented from moving in other rotational or directional ways (such as tilting, for example).

In an exemplary embodiment, the linear actuator assembly 1702 of the data storage device 2000 includes a linear motor 1711 adapted to move the actuator arm 122 relative to the rails 1703. The linear motor 1711 may include any suitable type of motor that moves the actuator arm 122 linearly along the rails 1703. For example, the linear motor 1711 may include a linear stepper motor, a piezoelectric inchworm motor, a linear voice coil motor, ball screw and gear motor, for example.

In a case in which the linear motor 1711 includes a linear stepper motor, a permanent alternating magnet is fixed to a device base extending parallel to the rails 1711. For example, the permanent alternating magnet may alternate polarities along a length of the permanent alternating magnet. The vertical guide 2056 may include two or more dynamic magnets (e.g., electromagnets) that interact with the permanent alternating magnet. For example, a controller (not shown) of the device 2000 may send a signal to the dynamic magnets to change polarity (such as to switch on and off) so that the dynamic magnets on the vertical guide 2056 move along the permanent alternating magnet extending along and between rails 1703 due to attractive and repellant forces formed therebetween.

In another case in which the linear motor 1711 includes a piezoelectric inchworm motor, a crawler can be attached to vertical guide 2056, to move horizontally along one or more of the rails 1703, or to move horizontally along a device base or shaft extending parallel to the rails 1703.

In yet another case, the linear motor 1711 includes a linear voice coil motor having a permanent alternating magnet fixed to a drive base extending parallel to the rails 1703. For example, the permanent alternating magnet may alternate polarities along a length of the permanent alternating magnet. Brackets 2025, 2026 are attached to a voice coil that interacts with the permanent alternating magnet. For example, the controller of the device 2000 may send a signal to the voice coil to change polarity such that the voice coil moves along the permanent alternating magnet due to attractive and repellant forces formed therebetween. Furthermore, the voice coil may encircle the permanent alternating magnet. In another embodiment, the permanent alternating magnet and the voice coil may be in a different arrangement than described.

Whatever mechanism is used in linear motor 1711, its motion moves brackets 2025, 2026 along rails 1703. The brackets 2025, 2026 are attached to vertical guide 2056, which in turn carries actuator arm 122. Accordingly, activation of linear motor 1711 causes actuator arm 122 and its head 104 to move linearly with the brackets 2025, 2026 along rails 1703. As such, the head 104 of the actuator arm 122 moves in a straight line radially on the data storage foil 102. Thus, for the entire stroke of motion along radial line 1707, no skew is introduced between the head 102 and a disc track, of which one track 115 is an example.

FIG. 20D shows a configuration in which the elevator 1708 has lowered actuator arm 122 in the z direction, and linear motor 1711 has also moved actuator arm 122 along rails 1703 so that the read/write head 104 can access a track on a lower data storage foil 102 of the stack. To enable linearly slidable foil support assembly 1704 (not shown in FIGS. 20A-20D) to move in unison with the actuator arm 122 in a z-direction, an additional elevator bracket 2058', which moves up and down by motive of elevator 1708, may be included along with an additional complementary projection 2060', which fits into elements (not shown) of the linearly slidable foil support assembly 1704 to enable the movement.

Although the various embodiments and figures illustrate storage devices with various numbers of storage media in a stack, these illustrations are exemplary only, and a data storage device may be provided with a plurality of data storage media with the ability to provide reduced disk to disk spacing according to embodiments of the disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A data storage system comprising:
   a data storage foil mounted within the data storage system, the data storage foil having at least one data storage surface, wherein the data storage foil is an independent data storage medium having a total thickness that is greater than zero and less than or equal to 1 millimeter, and wherein at least a portion of the data storage foil is non-rigid;
   a head configured to interact with the at least one data storage surface to carry out at least one of data read or data write operations; and
   a foil support external to the data storage foil and configured to move from a first location to a second location to support the data storage foil during the at least one of the data read or the data write operations.

2. The data storage system of claim 1 and wherein the at least one data storage surface comprises a magnetic film.

3. The data storage system of claim 1 and wherein the data storage foil is mounted on a spindle in the data storage system.

4. The data storage system of claim 3 and wherein the data storage foil is moveably mounted on the spindle in a configuration that enables movement of the data storage foil along the spindle.

5. The data storage system of claim 4 and further comprising a clamp that is configured the hold the data storage foil in place at a location along the spindle.

6. The data storage system of claim 1 and wherein the data storage foil is one of a plurality of data storage foils mounted on the spindle in the data storage system.

7. The data storage system of claim 1 and wherein the foil support is linearly slidable.

8. The data storage system of claim 1 and wherein the foil support comprises an air blade support or an air bearing support.

9. The data storage system of claim 1 and wherein:
the data storage foil comprises first and second opposing data storage surfaces; and
the head is mounted on a rotatable actuator arm that in configured to rotate between first and second positions, wherein the first position enables to head to interact with the first data storage surface, and wherein the second position enables the head to interact with the second data storage surface.

10. A method comprising:
mounting a data storage foil having at least one data storage surface in a data storage system, wherein the data storage foil is an independent data storage medium having a total thickness that is greater than zero and less than or equal to 1 millimeter, and wherein at least a portion of the data storage foil is non-rigid;
providing a head configured to interact with the at least one data storage surface to carry out at least one of data read or data write operations; and
providing a foil support external to the data storage foil and configured to move from a first location to a second location to support the data storage foil during the at least one of the data read or the data write operations.

11. The method of claim 10 and wherein the at least one data storage surface comprises a magnetic film.

12. The method of claim 10 and further comprising mounting the data storage foil on a spindle in the data storage system.

13. The method of claim 12 and wherein the data storage foil is moveably mounted on the spindle in a configuration that enables movement of the data storage foil along the spindle.

14. A system comprising:
a rotatable spindle;
a plurality of data storage foils mounted on the rotatable spindle, wherein each data storage foil of the plurality of data storage foils is an independent data storage medium having a total thickness that is greater than zero and less than or equal to 1 millimeter, and wherein at least a portion of each data storage foil of the plurality of data storage foils is non-rigid;
an actuator mechanism with at least one actuator arm configured to translate, along a length of at least one axis, among the plurality of data storage foils;
a head supported on the at least one actuator arm, the head configured to communicate with each data storage foil of the plurality of data storage foils; and
a foil support configured to move from a first location to a second location to support a data storage foil of the plurality of data storage foils during the at least one of the data read or the data write operations.

15. The system of claim 14 and wherein the foil support is linearly slidable.

16. The system of claim 15, and wherein the foil support comprises an air blade support or an air bearing support.

* * * * *

UNITED STATES PATENT AND TRADEMARK OFFICE
CERTIFICATE OF CORRECTION

PATENT NO. : 11,423,927 B2
APPLICATION NO. : 17/352703
DATED : August 23, 2022
INVENTOR(S) : Riyan Alex Mendonsa et al.

It is certified that error appears in the above-identified patent and that said Letters Patent is hereby corrected as shown below:

In the Claims

Column 21, Claim 9, Line 22, please replace the word "in" with the word --is--.

Column 21, Claim 9, Line 24, please replace the first occurrence of "to" with the word --the--.

Signed and Sealed this
Twenty-second Day of November, 2022

*Katherine Kelly Vidal*

Katherine Kelly Vidal
*Director of the United States Patent and Trademark Office*